US011695637B2

(12) United States Patent
Gritli et al.

(10) Patent No.: US 11,695,637 B2
(45) Date of Patent: Jul. 4, 2023

(54) NETWORK SERVICE DESCRIPTOR SUPPORT FOR NETWORK SLICE ISOLATION REQUIREMENTS

(71) Applicants: Nour Gritli, Montreal (CA); Maria Toeroe, Montreal (CA); Ferhat Khendek, Montreal (CA)

(72) Inventors: Nour Gritli, Montreal (CA); Maria Toeroe, Montreal (CA); Ferhat Khendek, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/791,036

(22) PCT Filed: Jan. 30, 2020

(86) PCT No.: PCT/IB2020/050758
§ 371 (c)(1),
(2) Date: Jul. 6, 2022

(87) PCT Pub. No.: WO2021/152347
PCT Pub. Date: Aug. 5, 2021

(65) Prior Publication Data
US 2023/0037914 A1 Feb. 9, 2023

(51) Int. Cl.
*H04L 41/0895* (2022.01)
*H04L 41/0806* (2022.01)
*H04L 41/0893* (2022.01)
(52) U.S. Cl.
CPC ...... *H04L 41/0895* (2022.05); *H04L 41/0806* (2013.01); *H04L 41/0893* (2013.01)

(58) Field of Classification Search
CPC ............. H04L 41/0895; H04L 41/0806; H04L 41/0893
See application file for complete search history.

(56) References Cited

U.S. PATENT DOCUMENTS 11,190,413 B1* 11/2021 Priya .................... H04L 41/5045
2018/0332485 A1* 11/2018 Senarath ............... H04L 41/044
2022/0197773 A1* 6/2022 Butler .................. H04N 21/234

FOREIGN PATENT DOCUMENTS

WO   2019190527 A1   10/2019

OTHER PUBLICATIONS

3GPP TS 28.531 V16.4.0 (Dec. 2019), Technical Specification Group Services and System Aspects; Management and Orchestration; Provisioning; (Release 16).
(Continued)

Primary Examiner — Michael Won
(74) Attorney, Agent, or Firm — Julie Dufort; Ericsson Canada Inc.

(57) ABSTRACT

A non-transitory computer readable media, methods, system and network function virtualization orchestrator can be used to instantiate a network service operating as at least a portion of a network slice. A network service descriptor describing the network service comprises at least one service deployment flavor; zero or more sharing allowed attribute defining if the network service or constituent instances of the network service is allowed to be shared with another network service instance, or with its constituent instances; and zero or more external placement rule attribute defining if the network service or constituent instances of the network service, is affine or anti-affine with current and future other network service or constituent instances of the current and future other network service.

10 Claims, 15 Drawing Sheets

(56) References Cited

OTHER PUBLICATIONS

3GPP, 3rd Generation Partnership Project; Technical Specification Group Services and System Aspects; Management and orchestration of networks and network slicing; Provisioning; Stage 2 and stage 3, TS 28.532 V0.4.0 (Jul. 2018).

3GPP, 3rd Generation Partnership Project; Technical Specification Group Services and System Aspects; Management and orchestration; Concepts, use cases and requirements (Release 16), 3GPP TS 28.530 V16.0.0 (Sep. 2019).

ETSI GR NFV-EVE 012 V3.1.1, Network Functions Virtualisation (NFV) Release 3; Evolution and Ecosystem; Report on Network Slicing Support with ETSI NFV Architecture Framework, Dec. 2017.

ETSI GS NFV-IFA 013 V2.7.1, Network Functions Virtualisation (NFV) Release 2; Management and Orchestration; Os-Ma-Nfvo reference point—Interface and Information Model Specification, Sep. 2019.

ETSI GS NFV-IFA 013 V3.3.1 (Sep. 2019), Network Functions Virtualisation (NFV) Release 3; Management and Orchestration; Os-Ma-Nfvo reference point—Interface and Information Model Specification.

ETSI GS NFV-IFA 014 V3.3.1 (Sep. 2019), Network Functions Virtualisation (NFV) Release 3; Management and Orchestration; Network Service Templates Specification.

KDDI Corporation, Huawei, Nokia, BT, IFA013ed341 Feasibility check and reserve NS, NFVIFA(19)000955r1, Nov. 25, 2019.

Z. Kotulski et al., On end-to-end approach for slice isolation in 5G networks. Fundamental challenges, Proceedings of the Federated Conference on Computer Science and Information Systems pp. 783-792, 2017, IEEE Catalog No. CFP1785N-ART.

ISR and Written Opinion, dated Oct. 13, 2020, from corresponding application PCT/IB2020/050758, 16 pages.

\* cited by examiner

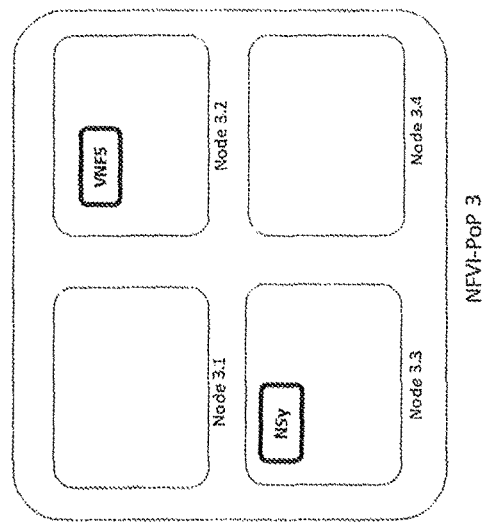
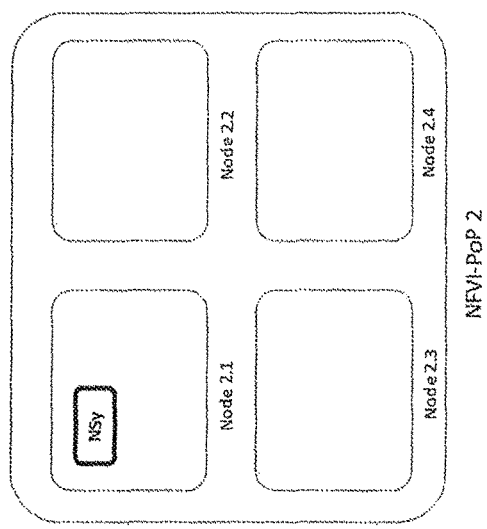
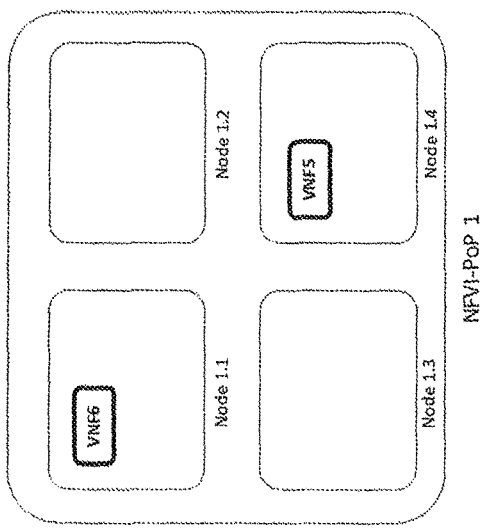
Figure 10

NETWORK SERVICE DESCRIPTOR SUPPORT FOR NETWORK SLICE ISOLATION REQUIREMENTS

TECHNICAL FIELD

The present disclosure relates to Network Function Virtualization (NFV) systems and network slicing.

BACKGROUND

Network slicing is a paradigm for running multiple logical networks, i.e. network slices, on top of a common physical infrastructure. These network slices are created to serve specific use cases with predefined performance requirements. According to the network slice information model defined in [3GPP TS 28.532 "Management and orchestration of networks and network slicing Provisioning; stage 2 and stage 3" 07 2018], a network slice is composed of network slice subnets, which in turn are composed of network functions or other network slice subnets.

The mapping between the network slice and the ETSI NFV information models is defined in [ETSI GR NFV-EVE 012 V3.1.1 "Network Functions Virtualization (NFV) Release 3; Evolution and Ecosystem; Report on Network Slicing Support with ETSI NFV Architecture Framework" 12 2017].

Prior to the instantiation of a network slice, a preparation phase is required, as described in [3GPP TS 28.530 V16.0.0 "Management of 5G networks and network slicing; Concepts, uses cases and requirements" 09 2019]. The main task in this step is the creation and on-boarding of the network slice template (NST). The NST includes a complete description of the structure, configuration and workflows for the network slice instantiation and life cycle management. The structure of the network slice consists of the required network slice subnets, which are described through network slice subnet templates (NSSTs).

Similarly, a NSST comprises the constituents of the network slice subnet; and refers to physical and/or logical resources and/or to other NSSTs; as well as the configuration and lifecycle management workflows. From a resource perspective, an NST—and similarly an NSST—can include references to network service (NS) descriptors (NSDs), which are designed to fulfill the resource and performance requirements of the network slice. These NSDs include references to virtualized network function (VNF) descriptors (VNFDs), physical network function (PNF) descriptors (PNFDs) and/or nested NSDs.

SUMMARY

There is provided a method for realizing a network slice and a network slice subnet in an NFV system which is managed by an orchestrator, by at most one, possibly composite, network service NS described by a network service descriptor NSD. To do so new attributes are introduced in the network service descriptor NSD and the constituents of the network service descriptor NSD to express sharing constraints and additional placement rules with respect to entities not related, i.e. external to the network service descriptor NSD.

There is provided a non-transitory computer readable media having stored thereon instructions for instantiating a network service operating as at least a portion of a network slice. The instructions comprise a network service descriptor comprising at least one network service deployment flavor; zero or more sharing allowed attribute, a given sharing allowed attribute defining if the network service instance, a nested network service instance, a virtual network function instance or a virtual link instance associated with the given sharing allowed attribute is allowed to be shared with an other network service instance, or nested network service instance, virtual network function instance or virtual link instance associated with the other network service instance; and zero or more external placement rule attribute, a given external placement rule attribute defining if the network service instance, the nested network service instance, the virtual network function instance or the virtual link instance, is affine or anti-affine with current and future other network service instances, or nested network service instances, virtual network function instances or virtual link instances associated with the current and future other network service instances. The zero or more sharing allowed attribute and the zero or more external placement rule attribute allowing to define the network slice and associated sharing and isolation constraints using the network service descriptor.

There is provided a method, executed by a network function virtualization orchestrator, for instantiating a network service operating as at least a portion of a network slice. The method comprises receiving a request for instantiating the network service, the network service being defined by a network service descriptor; upon determining that the network service descriptor has a sharing allowed attribute set to a value that indicates that sharing is forbidden at the network service descriptor level, triggering instantiation of all constituents of the network service without reusing any already running virtual network function, virtual link or network service of other network service instances; upon determining that the network service descriptor comprises sharing allowed attributes set to a value that indicates that sharing is forbidden for at least one constituent of the network service, triggering instantiation of the at least one constituent of the network service, without reusing any previously existing virtual network function, virtual link or network service of other network service instances; and otherwise, upon determining that the network service descriptor comprises sharing allowed constraints set to a value that indicates that sharing is allowed for at least one constituent of the network service, identifying at least one previously existing virtual network function, virtual link or network service instances of other network service instances that can be reused, and triggering a reuse of the identified at least one previously existing virtual network function, virtual link or network service of other network service instances, for the at least one constituent of the network service.

There is provided a method, executed by a network function virtualization orchestrator, for instantiating a network service operating as at least a portion of a network slice. The method comprises receiving a request for instantiating the network service, the network service being defined by a network service descriptor; identifying a placement option for the network service which satisfies zero or more external placement rule attribute of the network service descriptor, the zero or more external placement rule attribute defining placement constraints; upon determining that all external placement rule attribute of network services already running at the identified placement option are respected by the instantiation of the network service, instantiating the network service; and upon determining that at least one external placement rule attribute of the network service already running at the identified placement option is violated by the instantiation of the network service, returning to the identifying step.

There is provided a system executing a network function virtualization orchestrator operative to instantiate a network service instance operating as at least a portion of a network slice comprising processing circuits and a memory, the memory containing instructions executable by the processing circuits whereby the network function virtualization orchestrator is operative to execute the steps of any one of the steps described herein.

The network service descriptor, non-transitory computer readable media, methods, system and network function virtualization orchestrator provided herein present improvements to the way network service descriptor, non-transitory computer readable media, methods, system and network function virtualization orchestrator operate.

BRIEF DESCRIPTION OF THE DRAWINGS

FIG. 10 is a schematic illustration of a physical infrastructure example with three NFVI-PoPs and some VNF and NS instances running.

DETAILED DESCRIPTION

Figure 1:
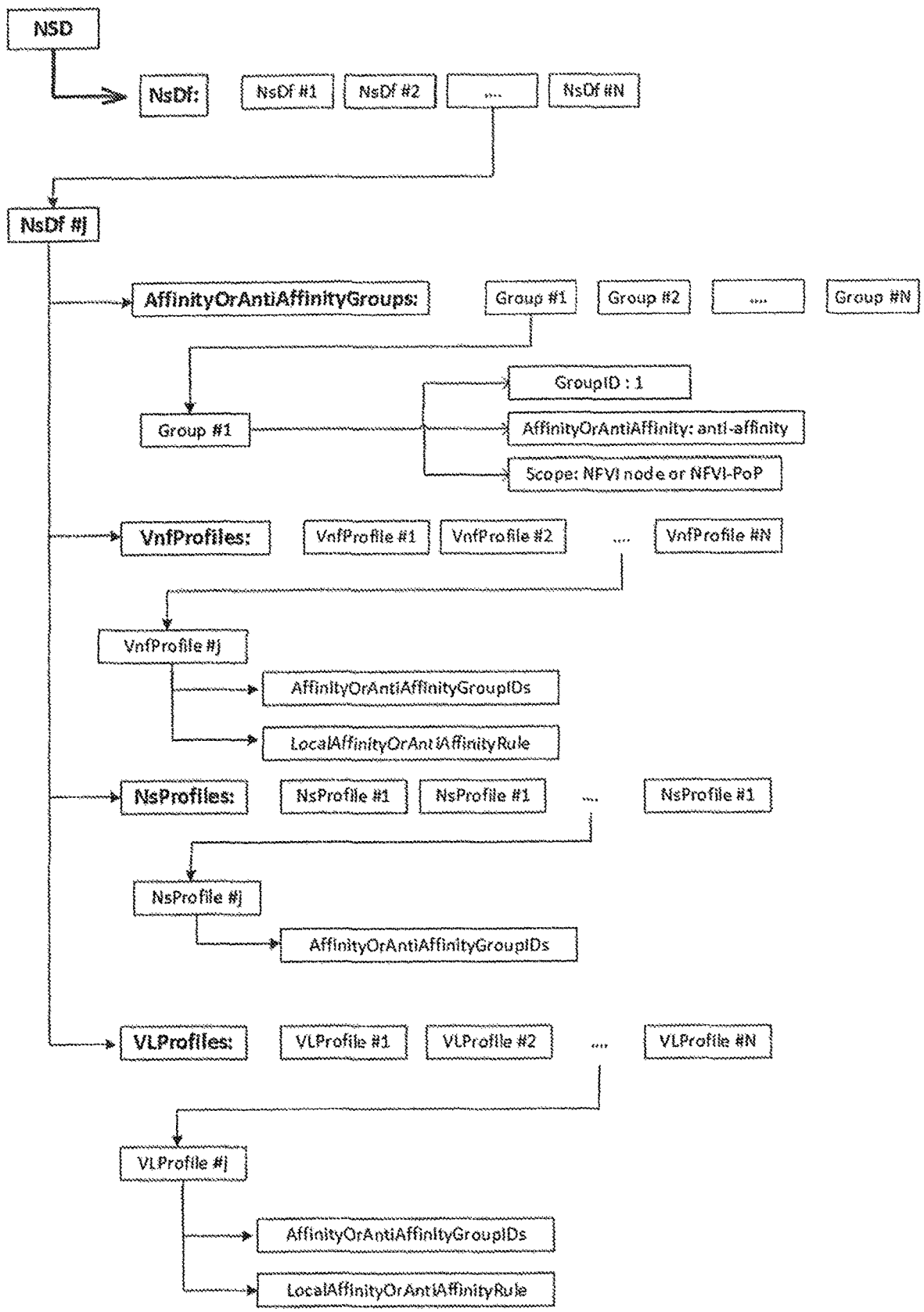
FIG. 1 a schematic illustration of an NSD of the prior art, showing affinity or anti-affinity rules information elements.

Various features will now be described with reference to the figures to fully convey the scope of the disclosure to those skilled in the art. Sequences of actions or functions may be used within this disclosure. It should be recognized that some functions or actions, in some contexts, could be performed by specialized circuits, by program instructions being executed by one or more processors, or by a combination of both. Further, computer readable carrier or carrier wave may contain an appropriate set of computer instructions that would cause a processor to carry out the techniques described herein. The functions/actions described herein may occur out of the order noted in the sequence of actions or simultaneously. Furthermore, in some illustrations, some blocks, functions or actions may be optional and may or may not be executed; these are generally illustrated with dashed lines.

A network slice or a network slice subnet can be considered as a network service (NS) from a resource management viewpoint. Hence, network slice subnets are mapped to NSs and the resources of their composing network functions (NFs) are managed as VNFs and/or PNFs.

Since network slices are created on top of a common physical infrastructure, isolation requirements are needed, to ensure that network slice instances do not affect each other. Isolation techniques can be performed for different purposes (e.g. security, high availability) and at different levels (e.g. management, resources, traffic isolation), such as described in [Z. Kotulski, T. et al., "On end-to-end approach for slice isolation in 5G networks. Fundamental challenges" in Federated conference on computer science and information systems (FedCSIS) 2017]. For instance, some use cases might require an isolated management of the network slice, so that the configuration, control and monitoring of the network slice will be independent from other network slices. Depending on the type of the isolation requirement, the processing of the isolation requirement might appear in different phases of the lifecycle of the network slice. For example, an isolation requirement, like physical isolation, can be expressed at design time, and then achieved during deployment. Another type of isolation requirement, such as traffic isolation, can be managed during the configuration or the operation of the network slice.

The design and the creation phases of a network slice should reflect the required degree of isolation of the network slice. Depending on the use case criticality, a tenant can require partial isolation, where only a subset of the network slice resources needs to be isolated, or a full isolation of the network slice, where all of the network slice resources need to be isolated. Furthermore, the required isolation can be physical and/or logical. Physical isolation implies the non-sharing of physical resources. For instance, a VNF considered as a critical resource in a network slice subnet should not be placed on the same physical host with VNFs of other subnets. In addition, network slice instances or network slice subnets instances can share resources. Hence, logical isolation might be required to restrict sharing of resources, i.e. NSs and/or VNFs, between network slice instances. During design time, these requirements should appear in the deployment templates, i.e. NST and NSDs, of a network slice.

In the 3GPP information model, a network slice and a network slice subnet have a "ServiceProfile", which represents the requirements that need to be supported. Among these requirements, there is the "resourceSharingLevel". This property specifies whether the resources of the network slice or the network slice subnet can be shared with other network slices or network slices subnets.

In ETSI NFV architecture, VNF instances can be shared by different NS instances. Presently, the sharing constraints are not part of the NSD information model. As described in [ETSI GS NFV-IFA 013 V3.3.1 "Network Functions Virtualisation (NFV) Release 3; Management and Orchestration; Os-Ma-Nfvo reference point-Interface and Information Model Specification" 09 2019], it is expected that OSS/BSS will indicate if an existing VNF instance needs to be used by another NS.

According to ETSI NFV specifications, physical isolation requirements can be expressed using the "AffinityOrAntiAffinityGroup" and the "LocalAffinityOrAntiAffinityRule" information elements (TEs) of the NSD, as described in [ETSI GS NFV-IFA 14 V3.3.1 "Network Functions Virtualisation (NFV) Release 3; Management and Orchestration; Network Service Templates Specification" 09 2019], and/or at runtime using "AffinityOrAntiAffinityRule" information element of the NS instantiation request.

In the NSD, affinity and anti-affinity groups can be defined to indicate the affinity or anti-affinity relationship between VNF, nested NS, or Virtual Link (VL) instances of different types. As illustrated in FIG. 1, each "AffinityOrAntiAffinityGroup" has an identifier, a type whether it is an affinity or anti-affinity group, and a scope describing the granularity of the physical isolation (i.e. Network Function Virtualization (NFVI) node or NFV Infrastructure Point of Presence (NFVI-PoP)).

The "LocalAffinityOrAntiAffinityRule" information element of the relevant profile can be used to describe the affinity or anti-affinity relationship, at a particular scope, between instances of the same VNF or VL type.

These affinity or anti-affinity groups and rules apply to the elements of the NSD and can be specified at the time the NSD is designed. As shown in FIG. 1, each NSD deployment flavour (NsDf) may include affinity and anti-affinity groups. These groups are then referenced in the VNF profiles, NS profiles and/or VL profiles of the NSD.

The local affinity and anti-affinity rules can be specified in VNF profiles and VL profiles applicable to instances created based on the given VNF or VL profile.

When there is a need to express affinity or anti-affinity towards VNFs or VLs which are not part of the NS, anti-affinity rules can be specified in the instantiation request of the NS.

The physical isolation described from a network slice perspective, might involve multiple network slices, each of which is mapped independently from one another to one or more NSs. Currently NFV systems do not support placement rules between independent NSs, i.e. between NSs without any nesting relation. I.e. the requirement of full physical isolation of an NS or a VNF with respect to current and future instances cannot be described using the current NSD information elements.

The current NSD also does not provide any information on whether it is allowed to share the NS and/or its elements with other NSs.

Since NFV is a key enabler for network slicing, it is desirable that NFV systems support such additional placement requirements and isolation requirements.

To overcome these limitations, network slices and network slice subnets can be realized in NFV systems in such a way that in each supporting NFV system, which is managed by an NFV Orchestrator, a given network slice or network slice subnet is realized by at most one, possibly composite, NS described by an NSD; and by introducing new attributes to the NSD and its constituents to express sharing constraints and additional placement rules with respect to entities not related (external) to the given NSD.

To do so, external placement rules and sharing constraints are defined for the NS and its constituents so that network slice and network slice subnet full and partial isolation requirements can be reflected at physical and logical levels. Steps for processing these constraints at the NS level are also defined.

Described herein is a method for representing, in each supporting NFV system, a network slice (or respectively a network slice subnet) as a single, possibly complex, NS, so that the relation of the network slice (or respectively of a network slice subnet) to other network slices (or respectively to other network slice subnets) can be expressed in each given NFV system as a relation of this top level NS to other NSs. This top-level NS can include other nested NSs, for example, if the network slice is composed of network slice subnets supported by the same NFV system. All the constituents of this top-level NS support the same network slice (or network slice subnet) in the given NFV system, and entities not belonging to this NS are external to the network slice (or network slice subnet) in question.

Therefore, the relationship of network slice (or network slice subnet) to other network slices (or respectively network slice subnets) will coincide with the relations of the NSs in the system, which eliminates the need of the NFV system being aware of network slices and network slice subnets. This also allows to express, for each given NFV system, the relation between network slices and network slice subnets at the NS level.

To express these relations at the NS level, different enhancements to the NSD are proposed. Namely the addition of sharing constraints and additional placement rules are proposed.

To provide sharing constraints for an NS and its constituent elements a Boolean attribute "sharingAllowed" can be introduced at different levels in the NSD. Depending on the level at which in the NSD an attribute is defined, it is applicable to NS, VNF, virtual link (VL) and/or nested NS instances, as shown in FIG. 2 and in tables 3-6.

When this "sharingAllowed" attribute is set to "False" at the NS level, an NS instance created using this NSD cannot be shared with any other NS. Consequently also, none of the constituent VNFs, VLs, and nested NSs of the NS can be shared; thus, it overrides the values set for the attribute "sharingAllowed" at these lower levels, and in particular the values set in other NSDs used for the nested NSs of this NS. This allows one to achieve full logical isolation.

Figure 2:
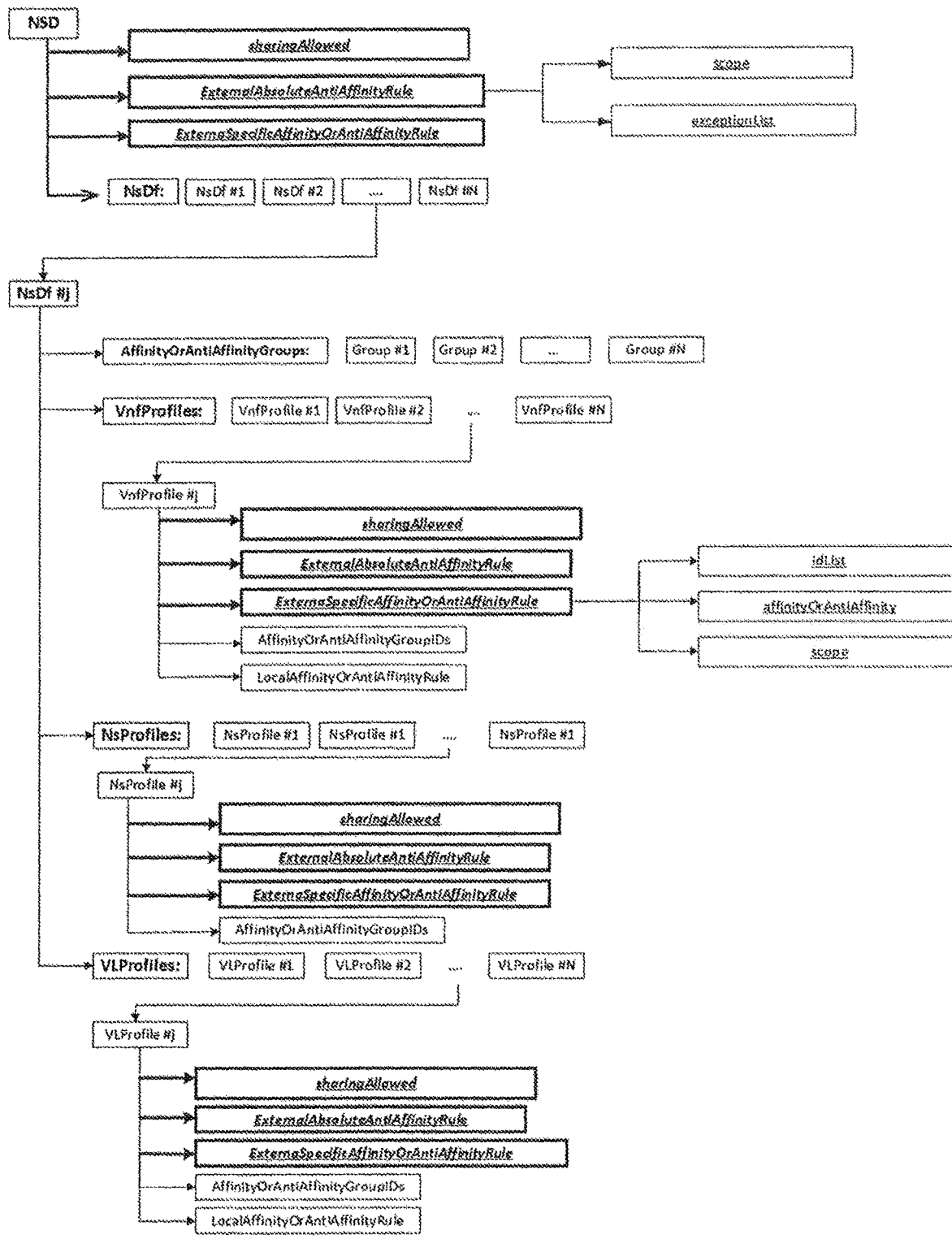
FIG. 2 is schematic illustration of an NSD with new sharing attributes and external placement attributes also referred as affinity and anti-affinity attributes.

When the "sharingAllowed" attribute is set to "True" at the NS level, sharing can be still limited at lower levels, i.e. in the "nsProfiles", "vnfProfiles" and/or "virtualLinkProfiles", of each deployment flavor, identified as "NsProfile #j", VnfProfile #j" and "VLProfile #j" in FIG. 2, which result in partial logical isolation.

However, when an NSD is used for a nested NS of a composite NSD and some of its "sharingAllowed" properties are set to "False", these sharing properties cannot be overridden in the corresponding "nsProfile" of the nested NS in the composite NSD. For example, if "NsProfile #j" of NSD in FIG. 2 is specified based on NSD2—not shown in the figure—and NSD2 has its "sharingAllowed" attribute set to "False", then setting to "True" the "sharingAllowed" attribute of "NsProfile #j", and/or the "sharingAllowed" attribute of NSD in FIG. 2 cannot override this "False" value.

Another piece of information that needs to be reflected in the NSD is the placement rules among NS instances representing different network slices. As mentioned previously anti-affinity constraints are used to express physical isolation in NFV systems. Two types of placement rules can be considered with respect to the requirement of physical isolation of network slices.

On the one hand, an NS, a VNF and/or a virtual link can be required to be fully anti-affine with everything (i.e. applying anti-affinity rules to already running NS and VNF instances as well as to NS and VNF instances that will be instantiated in the future) external to the NS instance to which they belong, which encapsulates all the constituents of a network slice (or network slice subnet) in the given system. This is called absolute anti-affinity. In the context of absolute placement rules, affinity is not considered, but exceptions to this rule are considered. It should be noted that exceptions to anti-affinity placement rules do not equate to affinity. Exceptions of the anti-affinity allow placing together such instances but do not mandates such placement.

On the other hand, a NS can have affinity or anti-affinity requirements with respect to some specific types of NSs or VNFs that are already known at design time.

Currently, virtual link descriptors (VLDs) cannot be specified outside of an NSD, hence VLDs cannot be referenced from outside of this NSD. Otherwise VLDs could be used to specify exception or specific anti-affinity.

An extension to the NSD is therefore presented, in which the NSD is extended at its different levels with an "externalAbsoluteAntiAffinityRule" attribute, as shown in FIG. 2 for which the "ExternalAbsoluteAntiAffinityRule" information element is defined as shown in table 1. The "externalAbsoluteAntiAffinityRule" attributes, as shown in FIG. 2 and tables 3-6 specify if the NS, VNFs, VLs and/or nested NS instances, should be anti-affine with current and future instances of NSs, VNFs and VLs of any type, that are not constituents of the given NS instance. It should be noted that "externalAbsoluteAntiAffinityRule" refers to the attribute and "ExternalAbsoluteAntiAffinityRule" refers to a type of the attribute. In table 1 the type is defined (also referred as an information element). Tables 3-6 specify the attributes of this type. The column "content" of the tables 3-6 refer to table 1 by the name of the IE. In FIG. 2, both are shown: i.e. the types (or IEs) with their structure as in table 1 and the places in the NSD where such attributes are introduced (i.e. at the NSD, VnfProfile, etc. levels) as in tables 3-6. As a result, the upper/lower case of the first character cannot reflect this distinction. Alternatively, the following notation could be used in FIG. 2 and throughout the text: sharingAllowed::Boolean; externalAbsoluteAntiAffinityRule::ExternalAbsoluteAntiAffinityRule.

When an external absolute anti-affinity is specified for a NSD, all its elements inherit this property, and it cannot be overridden when this NSD is reused as a nested NS to design a composite NS. To handle properly the composite NSD constituents, additional anti-affinity rules may be defined with respect to these NSD constituents in the profile of the nested NSD and/or in the composite NSD.

The "ExternalAbsoluteAntiAffinityRule" information element shown in table 1 includes the "scope" attribute, which is an enumeration indicating the physical scope of the rule, e.g. NFVI node, NFVI PoP, network-link-and-node, etc. It also includes the "exceptionList" attribute where NSs, VNFs and potentially VLs types can be specified to allow the collocation of their instances with constituents of the given NSD in a specified scope of the anti-affinity relationship.

TABLE 1

The proposed ExternalAbsoluteAntiAffinityRule information element

| Attribute | Qualifier | Cardinality | Content | Description |
| --- | --- | --- | --- | --- |
| scope | M | 1 | Enum | Specifies the scope of the affinity or anti-affinity relationship e.g. a NFVI node, an NFVI PoP, network-link-and-node, etc. |
| exception List | M | 0 . . . 1 | List of identifiers | Specifies the list of types instances of which are exempt from the external absolute anti-affinity rule. |

To specify the affinity or anti-affinity constraints of an NS with specific types of NSs, VNFs and/or VLs, a new information element is defined similarly, namely "ExternalSpecificAffinityOrAntiAffinityRule", shown in table 2, and the attributes using it in the NSD, vnfProfile, nsProfile, and vlProfile information elements, as shown in FIG. 2 and in tables 3-6.

Using this information element as shown in tables 3-6, it is possible to express affinity or anti-affinity with instances of VNFs, VLs and/or NSs types, which are not constituents of the instance of the concerned type.

This "ExternalSpecificAffinityOrAntiAffinityRule" information element has three attributes and is shown in table 2. The "idList" is an attribute containing a list of the types of instances with respect to which the affinity or anti-affinity is being specified. The "affinityOrAntiAffinity" attribute indicates whether the rule is for defining an affinity or anti-affinity constraint. And the "scope" attribute, is an enumeration indicating the physical scope of the rule, e.g. NFVI node, NFVI PoP, network-link-and-node, etc.

TABLE 2

The proposed ExternalSpecificAffinityOrAntiAffinityRule information element

| Attribute | Qualifier | Cardinality | Content | Description |
|---|---|---|---|---|
| idList | M | 1 | List if identifiers | Specifies the list of types with which the instance of the concerned type is affine or anti-affine. |
| affinityOrAntiAffinity | M | 1 | Enum | Specifies if the rule is: "affinity" or "anti-affinity". |
| scope | M | 1 | Enum | Specifies the scope of the affinity or anti-affinity relationship. E.g. NFVI node, NFVI PoP, network-link-and-node |

It should be noted that it is also possible to define an information element as a superset of the "ExternalAbsoluteAntiAffinityRule" and the "ExternalSpecificAffinityOrAntiAffinityRule" information elements, i.e. an "ExternalAffinityOrAntiAffinityRule" information element with the attributes of "scope", "affinityOrAntiAffinity", "idList" and "exceptionList", which can cover all the above cases. In this case, only one attribute would be added in the NSD, vnfProfile, nsProfile, and vlProfile information elements. The usage of such a superset information element would be constrained to exclude invalid cases such as absolute affinity.

The "ExternalSpecificAffinityOrAntiAffinityRule" specified at the top level in an NSD information element is applicable to all its constituent elements, i.e. VNFs, VLs and nested NSs. However, since in this case it is only limited to the listed types, additional affinity or anti-affinity rules can be defined at different levels of the NSD as shown in FIG. 2. Thus, these rules specified at the different levels are considered all together. For example, a VNF inherits the external specific anti-affinity rules of the NS to which it belongs and it can have its own external specific anti-affinity constraints.

Whatever is defined at the different levels, i.e. in the NSD, the vnfProfile, nsProfile, and VL profile, the attributes should not contradict each other. For instance, an NS, which needs to be anti-affine with another NS or VNF, cannot have one of its nested NSs or VNFs affine with that NS or VNF.

According to FIG. 2, Table 3 introduces the attributes to the NSD information element itself; Table 4 introduces the attributes as they are applicable to the VNF profile information element; Table 5 introduces the attributes as applicable to the VL profile information element; and finally, table 6 introduces the attributes for the NS profile information element used for nested NSs.

TABLE 3

The NSD information element extended with the proposed attributes

| Attribute | Qualifier | Cardinality | Content | Description |
|---|---|---|---|---|
| nsdIdentifier | M | 1 | Identifier | Identifier of this NSD information element. It Globally uniquely identifies an instance of the NSD. |
| designer | M | 1 | String | Specifies the designer of the NSD. |
| version | M | 1 | Version | Specifies the version of the NSD. |
| nsdName | M | 1 | String | Provides the human readable name of the NSD. |
| nsdInvariantId | M | 1 | Identifier | Identifies an NSD in a version independent manner. This attribute is invariant across versions of NSD. |

TABLE 3-continued

The NSD information element extended with the proposed attributes

| Attribute | Qualifier | Cardinality | Content | Description |
|---|---|---|---|---|
| nestedNsdId | M | 0...N | Identifier (Reference to Nsd) | References the NSD of a constituent nested NS. See note 1. |
| vnfdId | M | 0...N | Identifier (Reference to Vnfd) | References the VNFD of a constituent VNF. See note 1. |
| pnfdId | M | 0...N | Identifier (Reference to Pnfd) | References the PNFD of a constituent PNF. See note 1. |
| sapd | M | 0...N | Sapd | Provides the descriptor of a service access point of the network service. |
| virtualLinkDesc | M | 0...N | NsVirtualLinkDesc | Provides the constituent VLDs. See note 2. |
| vnffgd | M | 0...N | Vnffgd | Provides the descriptors of the applicable forwarding graphs. See note 2. |
| autoScalingRule | M | 0...N | Rule | Specifies a rule to trigger a scaling action on an NS instantiated according to the NSD. See notes 3 and 4. |
| lifeCycleManagementScript | M | 0...N | LifeCycle ManagementScript | Provides a life cycle management script written in a Domain Specific Language (DSL). |
| nsDf | M | 1...N | NsDf | Specifies a DF within the scope of an NSD. |
| security | M | 1 | SecurityParameters | Provides a signature to prevent tampering. |
| sharingAllowed | M | 0...1 | Boolean | Specifies if an instance of the NSD can be shared or not with other instances |
| externalAbsoluteAntiAffinityRule | M | 0...N | ExternalAbsoluteAntiAffinityRule | Specifies if NSs instantiated from this NSD are anti-affine with other NS instances of any kind |
| externalSpecificAffinityorAntiAffinityRule | M | 0...N | ExternalSpecificAffinityorAntiAffinityRule | Specifies if NSs instantiated from this NSD have affinity or anti-affinity with instances of other specific NS types |

TABLE 4

The vnfProfile information element extended with the proposed attributes

| Attribute | Qualifier | Cardinality | Content | Description |
|---|---|---|---|---|
| vnfProfileId | M | 1 | Identifier | Identifier of this vnfProfile information element. It uniquely identifies a VnfProfile. |
| vnfdId | M | 1 | Identifier (Reference to Vnfd) | References a VNFD. |
| flavourId | M | 1 | Identifier (Reference to VnfDf) | Identifies a flavour within the VNFD. See note 1. |
| instantiationLevel | M | 0...1 | Identifier | Identifier of the instantiation level of the VNF DF to be used for instantiation. If not present, the default instantiation level as declared in the VNFD shall be used. |
| minNumberOfInstances | M | 1 | Integer | Minimum number of instances of the VNF based on this VNFD that is permitted to exist for this VnfProfile. |
| maxNumberOfInstances | M | 1 | Integer | Maximum number of instances of the VNF based on this VNFD that is permitted to exist for this VnfProfile. |
| localAffinityOrAntiAffinityRule | M | 0...N | LocalAffinity OrAntiAffinityRule | Specifies affinity and anti-affinity rules applicable between VNF instances created from this profile. See clause 6.3.8. |
| affinityOrAntiAffinityGroupId | M | 0...N | Identifier | Identifier(s) of the affinity or anti-affinity group(s) the VnfProfile belongs to. See note 2. |

TABLE 4-continued

The vnfProfile information element extended with the proposed attributes

| Attribute | Qualifier | Cardinality | Content | Description |
|---|---|---|---|---|
| nsVirtualLinkConnectivity | M | 1 . . . N | NsVirtualLink Connectivity | Defines the connection information of the VNF, it contains connection relationship between a VNF connection point and an NS Virtual Link. |
| serviceAvailabilityLevel | M | 0 . . . 1 | Integer | If present, specifies the service availability level for the VNF instance created from this profile. See note 3. |
| sharingAllowed | M | 0 . . . 1 | Boolean | Specifies if a VNF instance of this VNF profile can be shared or not |
| externalAbsoluteAntiAffinityRule | M | 0 . . . N | ExternalAbsoluteAntiAffinityRule | Specifies if VNFs instantiated from this VNF profile are anti-affine with instances of other NSs of any kind |
| externalSpecificAffinityorAntiAffinityRule | M | 0 . . . N | ExternalSpecificAffinityorAntiAffinityRule | Specifies if VNFs instantiated from this VNF profile are affine or anti-affine with instances of other specific NSs and/or VNFs |

TABLE 5

The VirtualLinkProfile information element extended with the proposed attributes

| Attribute | Qualifier | Cardinality | Content | Description |
|---|---|---|---|---|
| virtualLinkProfileId | M | 1 | Identifier | Uniquely identifies this VirtualLinkProfile information element. |
| virtualLinkDescId | M | 1 | Identifier (Reference to NsVirtualLinkDesc) | Uniquely references a VLD. |
| flavourId | M | 1 | Identifier (Reference to VIrtualLinkDf) | Identifies a flavour within the VLD. |
| localAffinityOrAntiAffinityRule | M | 0 . . . N | LocalAffinityOrAntiAffinityRule | Specifies affinity and anti-affinity rules applicable between VLs instantiated from the referenced VLD. See clause 6.3.8. |
| affinityOrAntiAffiintyGroupId | M | 0 . . . N | Identifier (Reference to AffinityOrAntiAffinityGroup) | References an affinity or anti-affinity group the VLs instantiated according to the VlProfile belong to. See note 1. |
| maxBitrateRequirements | M | 1 | LinkBitrateRequirements | Specifies the maximum bitrate requirements for a VL instantiated according to this profile. See clause 6.5.5. See note 2. |
| minBitrateRequirements | M | 1 | LinkBitrateRequirements | Specifies the minimum bitrate requirements for a VL instantiated according to this profile. See clause 6.5.5. See note 2. |
| sharingAllowed | M | 0 . . . 1 | Boolean | Specifies if the VLs instantiated from this VL profile can be shared or not |
| externalAbsoluteAntiAffinityRule | M | 0 . . . N | ExternalAbsoluteAntiAffinityRule | Specifies if VLs instantiated from this VL profile are anti-affine with instances of other NSs of any kind |
| externalSpecificAffinityorAntiAffinityRule | M | 0 . . . N | ExternalSpecificAffinityorAntiAffinityRule | Specifies if VLs instantiated from this VL profile are affine or anti-affine with instances in other specific NSs and/or VNFs |

TABLE 6

The NsProfile information element extended with the proposed attributes

| Attribute | Qualifier | Cardinality | Content | Description |
| --- | --- | --- | --- | --- |
| nsProfileId | M | 1 | Identifier | Identifies an NS profile. |
| nsdId | M | 1 | Identifier (Reference to Nsd) | Identifies the NSD applicable to NS instantiated according to this profile. |
| nsDfId | M | 1 | Identifier (Reference to NsDf) | Identifies the applicable NS DF within the scope of the NSD |
| nsInstantiationLevelId | M | 0 . . . 1 | Identifier (Reference to NsLevel) | Identifies the NS level within the referenced NS DF to be used in the context of the parent NS instantiation. If not present, the default NS instantiation level as declared in the referenced NSD shall be used. |
| minNumberOfInstances | M | 1 | Integer | Minimum number of nested NS instances based on the referenced NSD that is permitted to exist for this NsProfile. |
| maxNumberOfInstances | M | 1 | Integer | Maximum number of nested NS instances based on the referenced NSD that is permitted to exist for this NsProfile. |
| affinityOrAntiAffinityGroupId | M | 0 . . . N | Identifier (Reference toAffinityOrAnti AffinityGroup) | Identifies an affinity or anti-affinity group the NSs created according to this NsProfile belongs to. |
| nsVirtualLinkConnectivity | M | 1 . . . N | NsVirtualLinkConnectivity | Defines the connection information of the NS, it contains connection relationship between an NS SAP and an NS virtual Link of the composite NS. |
| sharingAllowed | M | 0 . . . 1 | Boolean | Specifies if NSs instantiated from this NS profile can be shared or not |
| externalAbsoluteAntiAffinityRule | M | 0 . . . N | ExternalAbsolute AntiAffinityRule | Specifies if NSs instantiated from this NS profile are anti-affine with instances of other NSs of any kind |
| externalSpecificAffinityorAntiAffinityRule | M | 0 . . . N | ExternalSpecific AffinityorAntiAffinityRule | Specifies if NSs instantiated from this NS profile have affinity or anti-affinity with instance of other specific NSs |

TABLE 7

Extended attributes of the NsProfile information element

| Attribute | Qualifier | Cardinality | Content | Description |
| --- | --- | --- | --- | --- |
| nsProfileId | M | 1 | Identifier | Identifies an NS profile. |
| nsdId | M | 1 | Identifier (Reference to Nsd) | Identifies the NSD applicable to NS instantiated according to this profile. |
| nsDfId | M | 1 | Identifier (Reference to NsDf) | Identifies the applicable NS DF within the scope of the NSD. |
| nsInstantiationLevelId | M | 0 . . . 1 | Identifier (Reference to NsLevel) | Identifies the NS level within the referenced NS DF to be used in the context of the parent NS instantiation. If not present, the default NS instantiation level as declared in the referenced NSD shall be used. |
| minNumberOfInstances | M | 1 | Integer | Minimum number of nested NS instances based on the referenced NSD that is permitted to exist for this NsProfile. |

TABLE 7-continued

Extended attributes of the NsProfile information element

| Attribute | Qualifier | Cardinality | Content | Description |
| --- | --- | --- | --- | --- |
| maxNumberOfInstances | M | 1 | Integer | Maximum number of nested NS instances based on the referenced NSD that is permitted to exist for this NsProfile. |
| affinityOrAntiAffinityGroupId | M | 0 . . . N | Identifier (Reference toAffinityOrAntiAffinityGroup) | Identifies an affinity or anti-affinity group the NSs created according to this NsProfile belongs to. |
| nsVirtualLinkConnectivity | M | 1 . . . N | NsVirtualLinkConnectivity | Defines the connection information of the NS, it contains connection relationship between an NS SAP and an NS virtual Link of the composite NS. |
| sharingAllowed | M | 1 | Boolean | Specifies if the NS can be shared or not |
| externalAbsoluteAntiAffinityRule | M | 0 . . . 1 | ExternalAbsolute AntiAffinityRule | Specifies if NSs instantiated from this nsProfile have an absolute anti-affinity |
| externalSpecificAffinityorAntiAffinityRule | M | 0 . . . N | ExternalSpecificAffinityorAntiAffinityRule | Specifies if NSs instantiated from this nsProfile have specific affinity or anti-affinity with other NSs, VNFs of a different type and/or of the same type |

Figure 3:
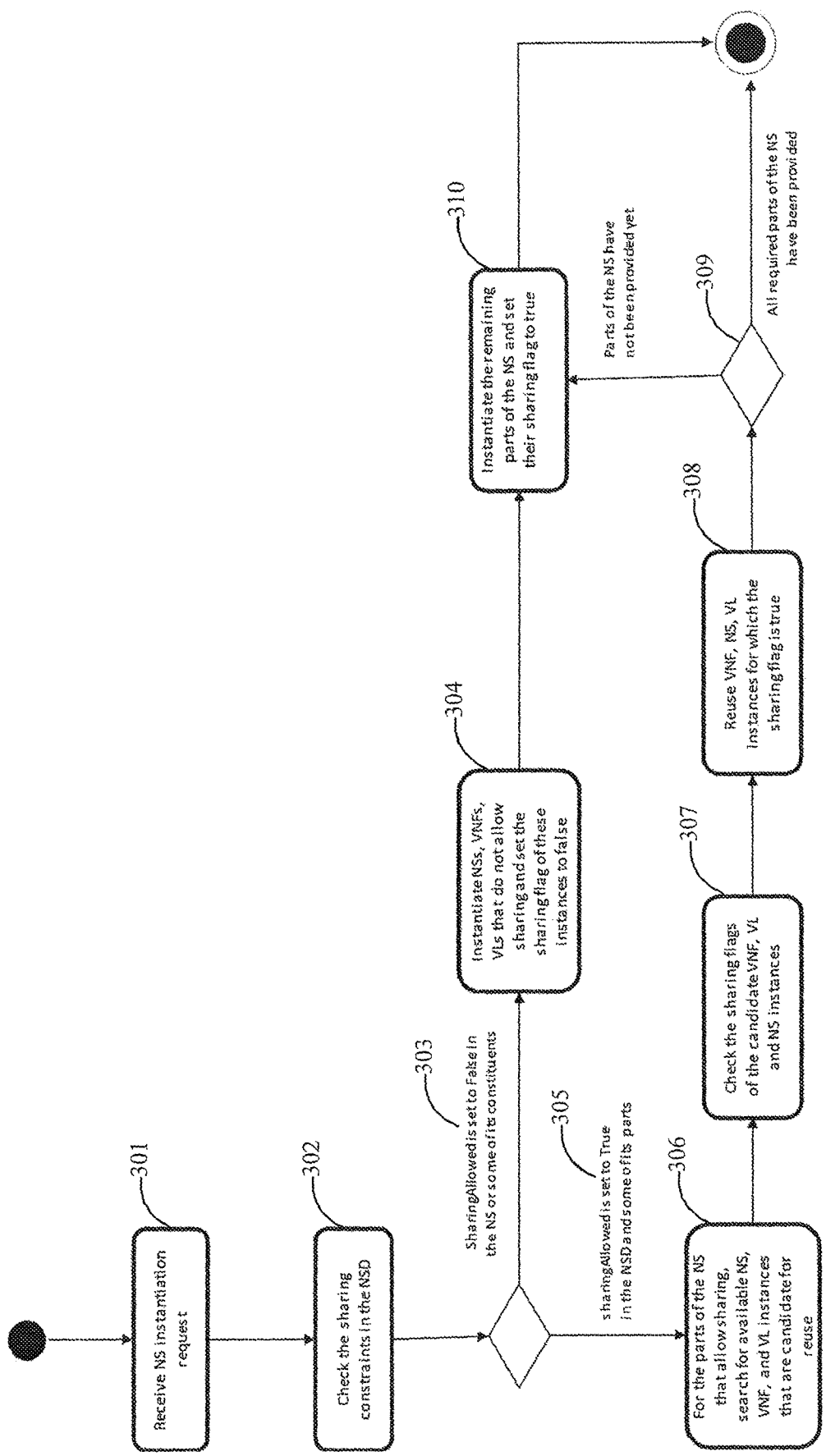
FIG. 3 is a flowchart of a method for processing the sharing constraint attributes.

FIG. 3 is a flowchart that reflects how the NFV Orchestrator (NFVO) applies the "sharingAllowed" attribute.

When receiving an NS instantiation request, step 301, the NFVO checks if the NSD information element has any sharing constraint step 302, i.e. if the "sharingAllowed" attribute is set to false at any level in the NSD.

If it is the case that the "sharingAllowed" attribute is set to false for some elements of the NS, 303, then none of these elements, which are set to false, of the NS can be shared. Hence, the NFVO will trigger the instantiation of these elements of the NS without reusing any of the VNFs or NSs and will set their sharing flag to false, step 304.

If the NSD information element and its constituents allow sharing, 305, the NFVO will search, step 306, for available VNF, NS and VL instances that can be reused with respect to their types and capacity constraints. Then, the NFVO checks the sharing flag of the found candidate instances, step 307, to determine if they can be reused or not. If the candidate instances can be reused, then the NFVO reuses them, step 308.

In either case (i.e. whether sharing was not allowed, or if reuse was considered) the NFVO triggers the instantiation of any not yet provided constituents (i.e. necessary NS, VNF and VL instances), step 310. The sharing flags of these instances is set to true to allow sharing.

Figure 4:
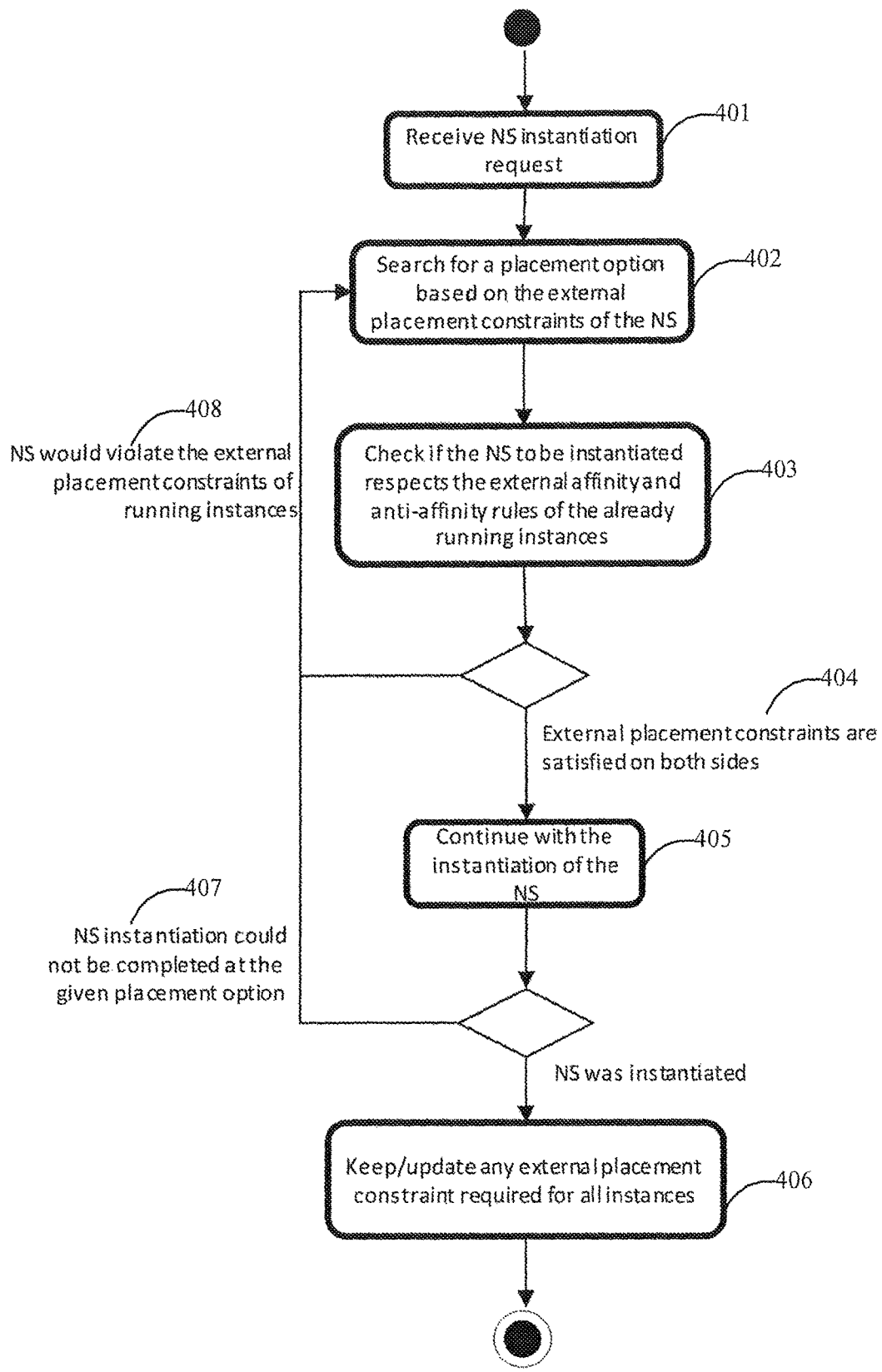
FIG. 4 is a flowchart of a method for processing the external placement or affinity and anti-affinity attributes.

The external placement rules are processed according to the flowchart of FIG. 4. When a new request is received to instantiate an NS, step 401, the NFVO looks for a placement option which could satisfy the external placement rules included in the NSD of the NS to be instantiated, step 402.

Once such an option is found, the NS to be instantiated is checked against the external placement rules, 404, of the instances already running at the given placement option, step 403. If there is no violation, the instantiation can proceed, step 405, with all the other checks, e.g. if the NS internal placement constraints can also be satisfied.

If everything is OK and the NS could be instantiated with all its constituents, the NFVO keeps the external placement rules information for the just instantiated NS, step 406, and it may also update some information for the constraints of the running instances.

If the NS instantiation could not be completed either because further constraints of the NS could not be satisfied, 407, or the constraints of the instances at the current placement option would have been violated, 408, then the NFVO looks for another placement option.

When a VNF or an NS has an external (specific or absolute) anti-affinity rule, while it also allows sharing, the sharing property needs to be ignored since the anti-affinity prevents placement in a physical resource common with other instances let alone sharing an instance with these other resources. As such, external specific or external absolute anti-affinity constraints override the sharing constraints which allows for sharing (i.e. set to true).

The existing affinity or anti-affinity constraints, i.e. "AffinityOrAntiAffinityGroup" and "LocalAffinityOrAntiAffinityRule", are used to describe affinity or anti-affinity inside an NS instance, while the new attributes introduced for external placement rules are complementary to these existing ones, since they describe affinity or anti-affinity with elements external to the given NS instance. Therefore, the two types of attributes can coexist without contradicting each other.

These relations can be used to determine the order of processing. These relations suggest that first the external placement rules may be processed to select a placement option eligible for the instantiation of the NS. Then, for this selected placement option, the sharing constraints and the internal placement constraints may be processed to determine if the NS can reuse existing instances for some or all of its constituents, while the remaining can be instantiated at the given placement option without violating any constraints.

Figure 5:
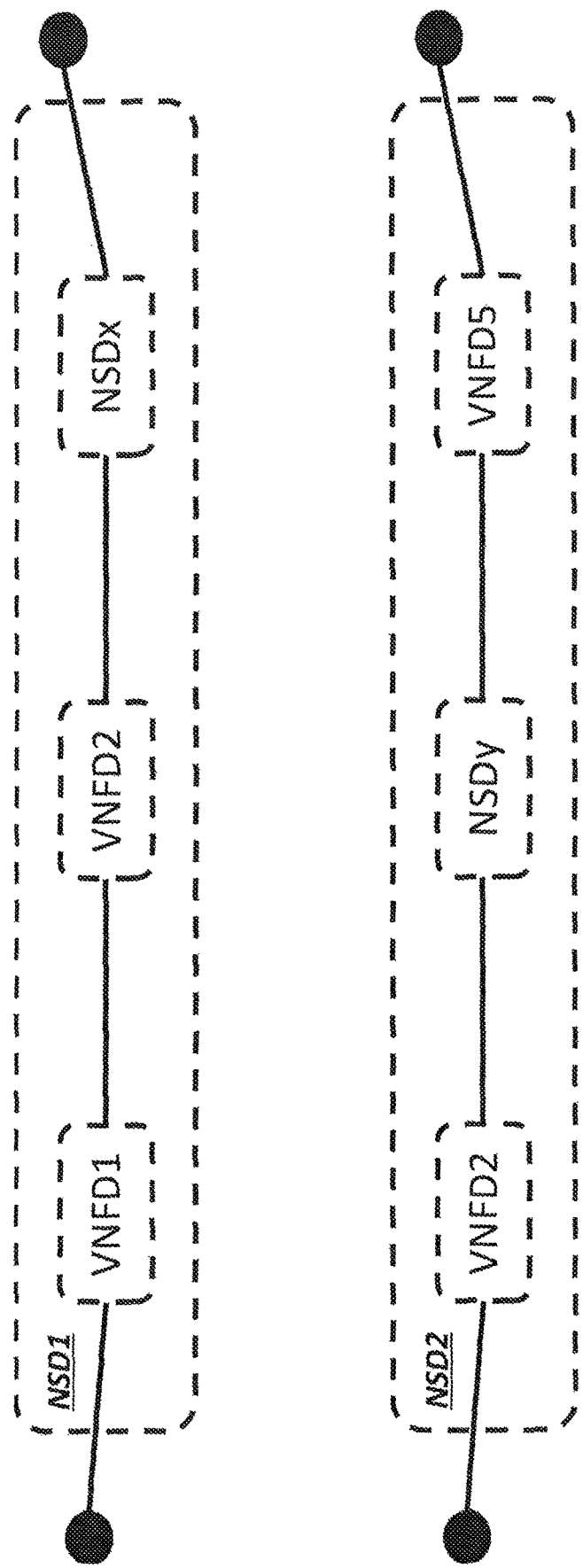
FIG. 5 is a schematic illustration of two example composite NSDs representing two network slices.

FIG. 5 illustrates two composite NSDs, NSD1 and NSD2, which represent the deployment templates of two different network slices applicable to a given NFV system. This figure will be used in an example considering the sharing aspect. These NSDs have the following composition and constraints for this example:
NSD1 is composed of profiles for VNFD1, VNFD2 and NSDx;
NSD1, and profiles of VNFD1 and NSDx have sharingAllowed=true; while the profile of VNFD2 has sharingAllowed=false;
NSD2 is composed of profiles for VNFD2, NSDy, and VNFD5; and
NSD2, and profiles of VNFD2, VNFD5 and NSDy have sharingAllowed=true.

Figure 6:
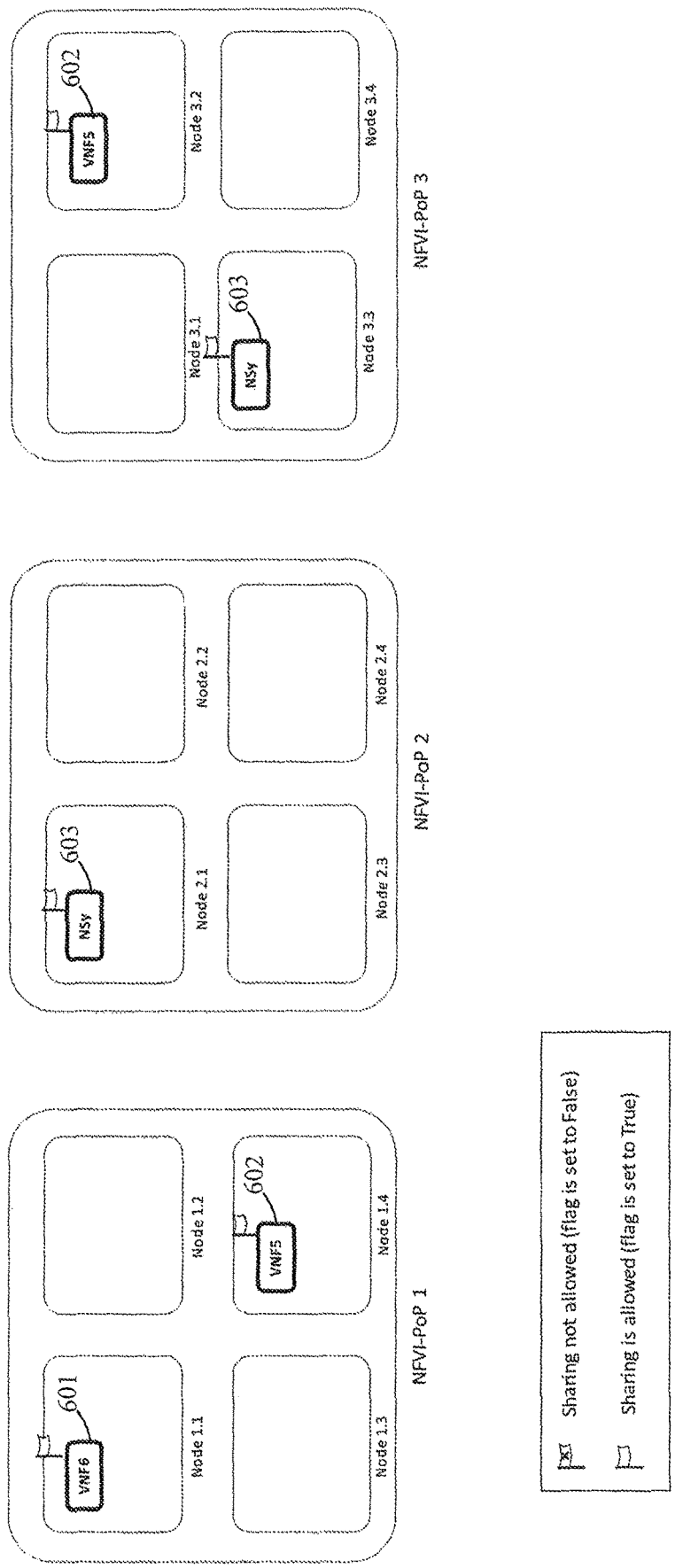
FIG. 6 is a schematic illustration of a physical infrastructure example with three NFVI-PoPs in which some VNF and NS instances are running.

FIG. 6 illustrates an NFV system deployed on a physical infrastructure with three NFVI-PoPs, where each NFVI-PoP consists of four nodes. There are some NSs and VNFs already deployed in the system of FIG. 6. An instance of VNF6 (601) runs in Node1.1, instances of VNF5 (602) run in Node1.4 and Node3.2, and instances of NSy (603) run in Node2.1 and Node3.3. None of these instances were instantiated from NSD1 or NSD2 and they do not have any external placement or sharing constraints.

Figure 7:
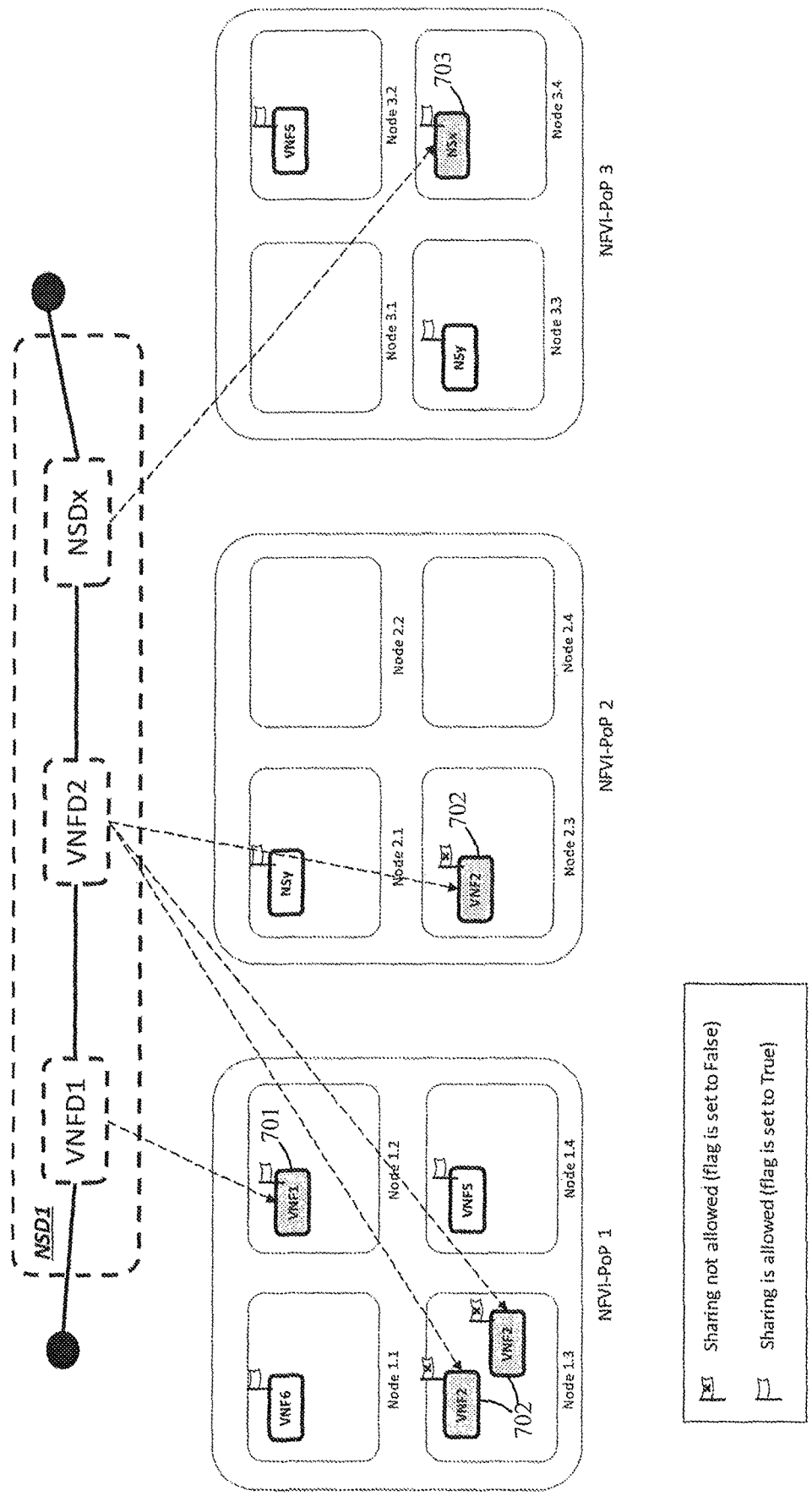
FIG. 7 is a schematic illustration showing an example instantiation of an instance of NSD1 (NS1) in the physical infrastructure of FIG. 6.

Turning to FIG. 7, when deploying NS1 (the network service instance defined by NSD1) from NSD1, the NFVO checks the sharing constraints of NSD1. According to the "sharingAllowed" attribute in the profile of VNFD2 in NSD1, VNF2 instances cannot be shared. Hence, the NFVO launches the instantiation procedure for the VNF2 instances (702) and they are placed in Node1.3 and Node2.3 as shown in FIG. 7.

Since the other profiles, i.e. VNFD1 and NSDx do not constrain sharing, the NFVO will first search for available instantiated resources that could be reused. In this example, no such instantiated resources are found. Consequently, the NFVO will continue the deployment without reusing any of the available VNFs or NSs. The NFVO initiates the instantiation of VNF1 and NSx. The VNF1 instance (701) is placed in Node1.2, while the NSx instance (703) is placed in Node3.4.

At the completion of the instantiation, the sharing flags of the new instances 701, 702, 703 are set as follows: for instances of VNF2 the sharing flags are set to false not to allow sharing, while for the VNF1 and NSx instances the sharing flags are set to true allowing sharing. In the context of this description, the words "flag" and "attribute" may be used interchangeably to describe similar concepts.

Figure 8:
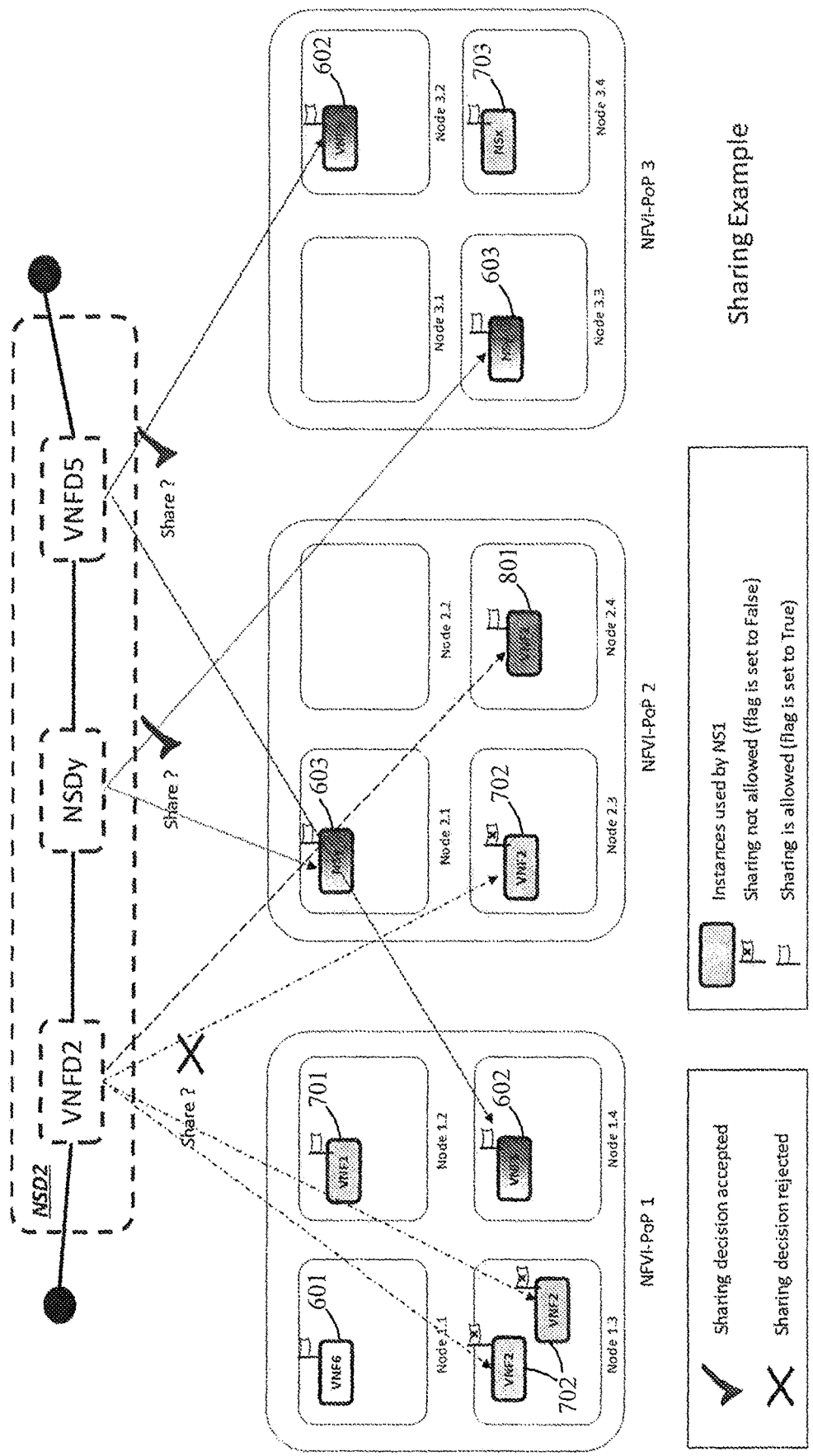
FIG. 8 is a schematic illustration showing an example instantiation of NS2 from NSD2, in addition to NS1, in the physical infrastructure of FIG. 6.

Turning to FIG. 8, the NFVO receives an instantiation request for an instance of NSD2, that is NS2, and it is deployed in the same infrastructure as in FIGS. 6 and 7, where the instances for NS1 701, 702, 703 and other instances 601, 602, 603 are running.

NSD2 does not constrain sharing at any level. Hence, as opposed to the previous case, when deploying a VNF2 instance of VNFD2 according to its profile in NSD2, the NFVO will look for already running instances of VNFD2. Since it can find the VNF2 instances of NS1, the NFVO checks if these instances can be shared, which is not the case. Accordingly, these VNF2 instances cannot be reused and the NFVO will initiate the instantiation of a new VNF2 instance (801) for NS2 in Node2.4 and set its sharing flag to true, allowing sharing.

At the same time, to deploy VNF5 from VNFD5 for NS2, the NFVO detects that VNF5 instances (602) are already running on Node1.4 and Node3.2, and they can provide resources necessary to serve NS2 as well. Since, these instances indicate that they can be shared with other NSs, the NFVO decides to reuse them for NS2. The same applies to NSy, which also has already deployed instances (603) in Node2.1 and Node3.3 allowing sharing. Hence, they are reused for NS2 and become shared instances 602, 603.

Figure 9:
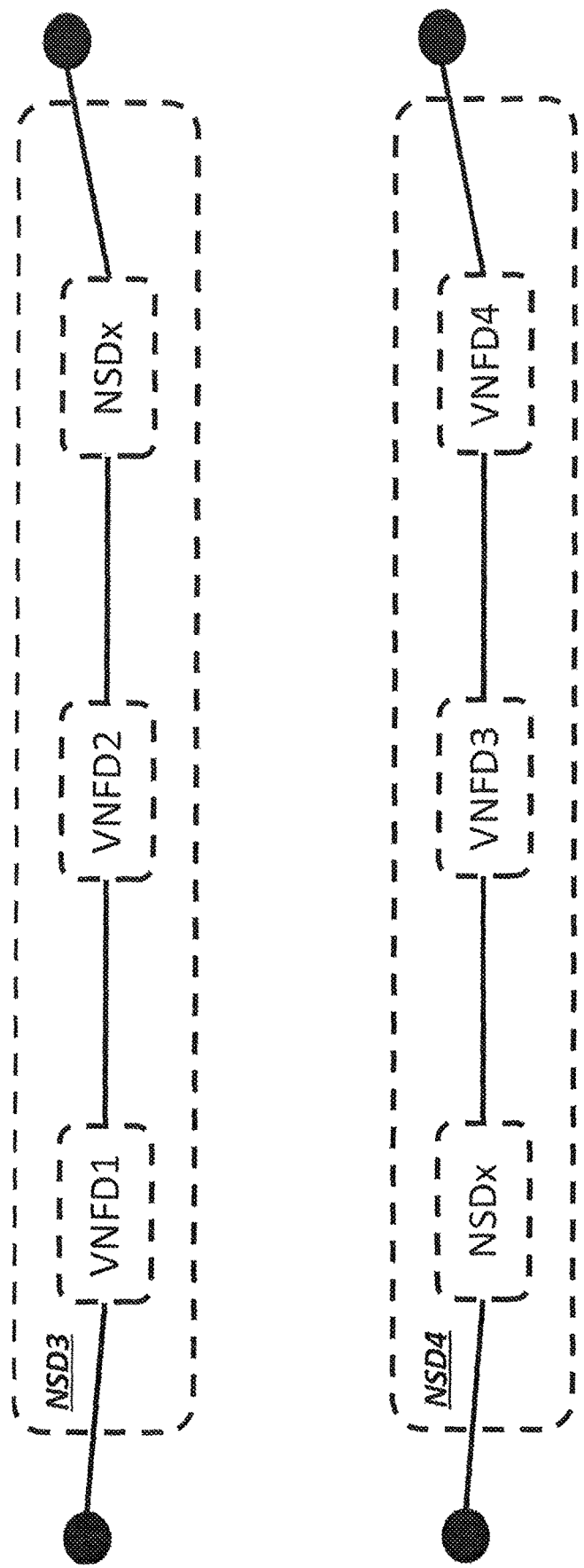
FIG. 9 is a schematic illustration of two other example composite NSDs representing two network slices.

FIG. 9 illustrates NSD3 and NSD4 and will be used in an example considering the external placement rules aspect. In this example a network slice is to be deployed in an NFV system, which has the same constituents as NSD1 of the previous example. I.e. VNFD1, VNFD2 and NSDx. This network slice also specifies the following physical isolation requirements:
the network slice instances cannot share nodes with functionalities realized by NSDy;
functionalities realized by VNFD1 require full isolation at the node level;
functionalities realized by NSDx cannot share physical nodes with instances of VNFD5; and
instances of NSDx cannot be collocated within an NFVI-PoP.

For the deployment of this network slice rather than using NSD1 of the previous example a new NS descriptor NSD3 is created with profiles of VNFD1, VNFD2 and NSDx as its constituents, as shown in FIG. 9. For NSD3 and its constituent profiles the appropriate anti-affinity rules are defined to reflect the aforementioned requirements.

The first requirement towards NSD3 is a specific anti-affinity requirement, so Rule1 is defined as: "ExternalSpecificAffinityOrAntiAffinityRule" for NSD3 itself. This will be applicable to the instances of NSD3 and all its constituents. The rule has the following attributes: type="anti-affinity"; idList={NSDy}; and scope="NFVI-Node".

For the second requirement, an absolute anti-affinity Rule 2 (i.e. "ExternalAbsoluteAntiAffinityRule") is added to the profile of VNFD1 in NSD3. Its attributes are: scope="NFVI-Node" and exceptionList={ }.

For the third and fourth requirements, it is assumed that NSDx already defines a Rule 3: "ExternalAbsoluteAntiAffinityRule" with the scope "NFVI-node". Since this applies even when the NSDx is used as a nested NS in NSD3, it ensures that instances of NSDx will not be collocated with anything else including instances of VNFD5. Hence no additional rule is required.

On the other hand, the fourth requirement also requires that instances of NSDx are placed in different NFVI-PoPs. This is not ensured with the above rule and the profile of NSDx in NSD3 defines a Rule 4: "ExternalSpecificAffinityOrAntiAffinityRule" with the attributes: type="anti-affinity"; idList={NSDx} and scope="NFVI-PoP".

Figure 11:
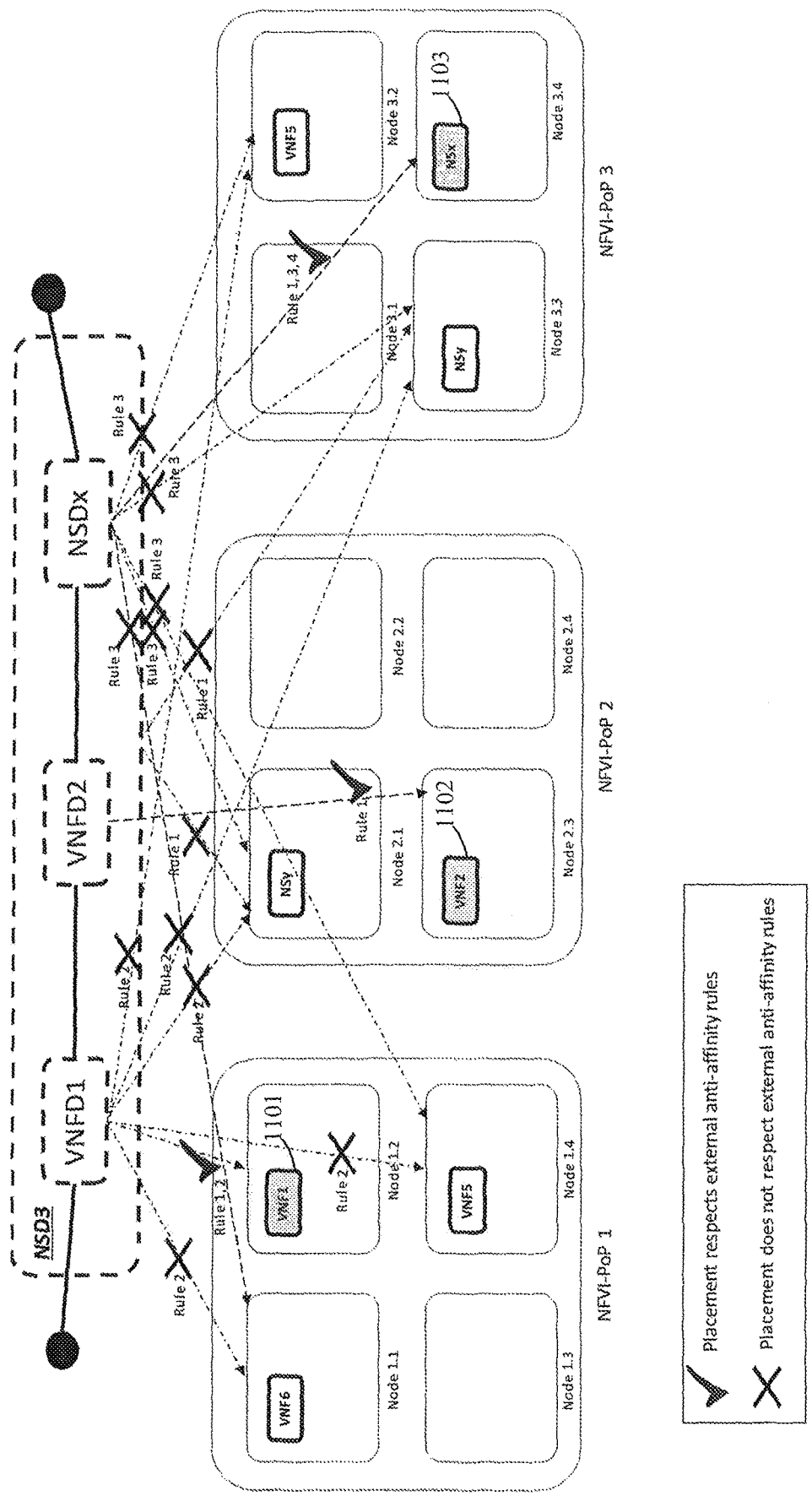
FIG. 11 is a schematic illustration showing an example instantiation of NS3 from NSD3 in the physical infrastructure of FIG. 10.
Figure 12:
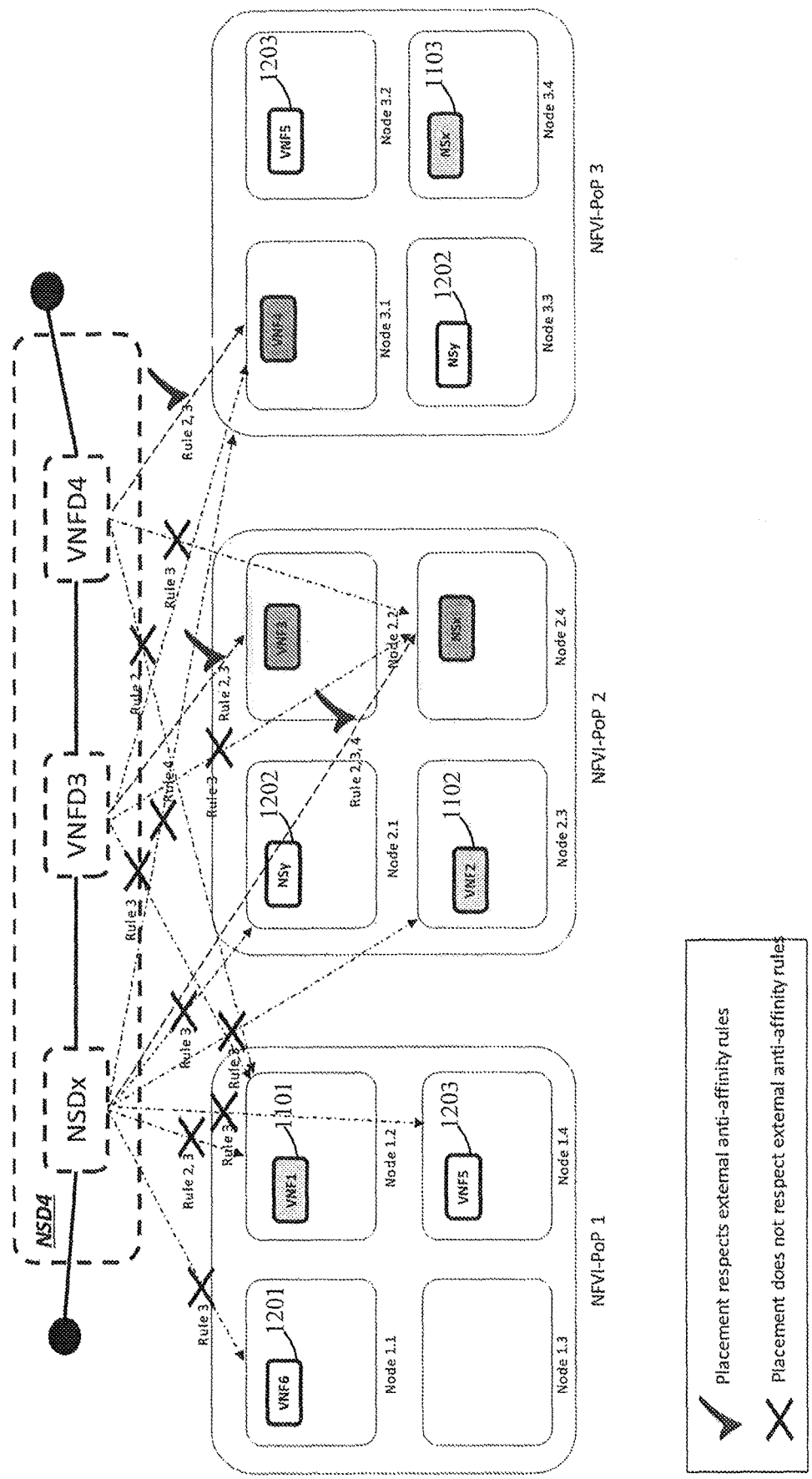
FIG. 12 is a schematic illustration showing an example instantiation of NS4 from NSD4, in addition to NS3, in the physical infrastructure of FIG. 10.

FIGS. 10 to 12 present an example of the use of these placement rules. In this example, only the external specific and absolute anti-affinity rules are considered.

As shown in FIG. 10, the NFV system has a physical infrastructure organized into three NFVI-PoPs and already runs some VNF and NS instances. An instance of NSD3 will be deployed in this system with constraints as discussed previously and an instance of NSD4 shown in FIG. 9. NSD4 does not define additional constraints.

Turning to FIG. 11, to deploy an instance of NSD3, that is NS3, first the NSD3 and its constituents are checked. NS3 itself cannot share nodes with instances of NSDy, which eliminates as options Node2.1 and Node3.3 for any constituents of NS3, as shown in FIG. 11 by the dashed arrows from the NSD3 crossed according to Rule 1.

For VNF1, since it has absolute anti-affinity at the node scope, all placement option where a node already has a tenant (such as Node1.1) need to be dismissed (see crossed arrows for Rule 2 in FIG. 11). The NFVO can select Node1.2 (see ticked arrow for Rule 2) and this constraint needs to be maintained for future as well, so no other instance can share Node1.2 as long as VNF1 is there.

When instantiating VNF2, Rule 1 still applies as it is a constituent of NS3, therefore Node2.1 and Node3.3 are excluded. VNF2 has no other constraint. Thus, it can be placed in Node2.3, which is permitted by Rule 1.

To instantiate NSx from NSDx, Rule 3 eliminates all nodes where other instances are running similarly to Rule 2 for VNF1 (including those eliminated by Rule 1 as well). Since there are no instances of NSDx in the system yet, Rule 4 does not pose any constraint at the moment, but it needs to be maintained in the future together with the other constraints. So, NSx of NS3 can be placed in Node3.4. The NS3 constituents 1101, 1102, 1103 are shown with their placement in FIG. 11.

Turning to FIG. 12, after the instantiation of NS3, the NFV system receives an instantiation request for NS4 which is for a second network slice, which does not have any isolation requirement.

Hence, to deploy the constituents of NS4, the NFVO will check the placement rules of the running instances. In FIG. 12, the constituents of NS3 1101, 1102, 1103 are illustrated as well as some other running instances 1201, 1202, 1203.

When instantiating NSx for NS4, the following applies: Rule 2 of NS3, that VNF1 of NS3 needs to remain fully isolated eliminating Node1.2; Rule 3 of NSDx itself that it should be isolated at the node level eliminating Node1.1, Node1.4, Node2.1, Node2.3, Node3.2, Node3.3 and Node3.4; and Rule 4 of NS3 needs to be maintained for the instances of NSx, which eliminates the entire NFVI-PoP3.

Placing NSx in Node2.4 is one of the few possibilities remaining as shown in FIG. 12 with the ticked dashed arrow.

Instantiating VNF3 of VNFD3 and VNF4 of VNFD4 of NSD4 need to follow two constraints: Rule 2 of NS3, that VNF1 of NS3 needs to remain fully isolated eliminating Node1.2; and Rule 3 of NSDx itself that it should remain isolated at the node level, which should eliminate Node2.4, but since this NSx instance is part of NS3 to which VNF3 and VNF4 will belong as well, an anti-affinity rule needs to be added for them in the profile of NSDx in NSD3. This step should have been part of the definition of NSD3, i.e. the adjustment should happen when the NSDx was selected to be included in NSD3.

VNF3 and VNF4 are instantiated in Node2.2 and Node3.1 as shown in FIG. 12 with the ticked dashed arrows.

Figure 13:
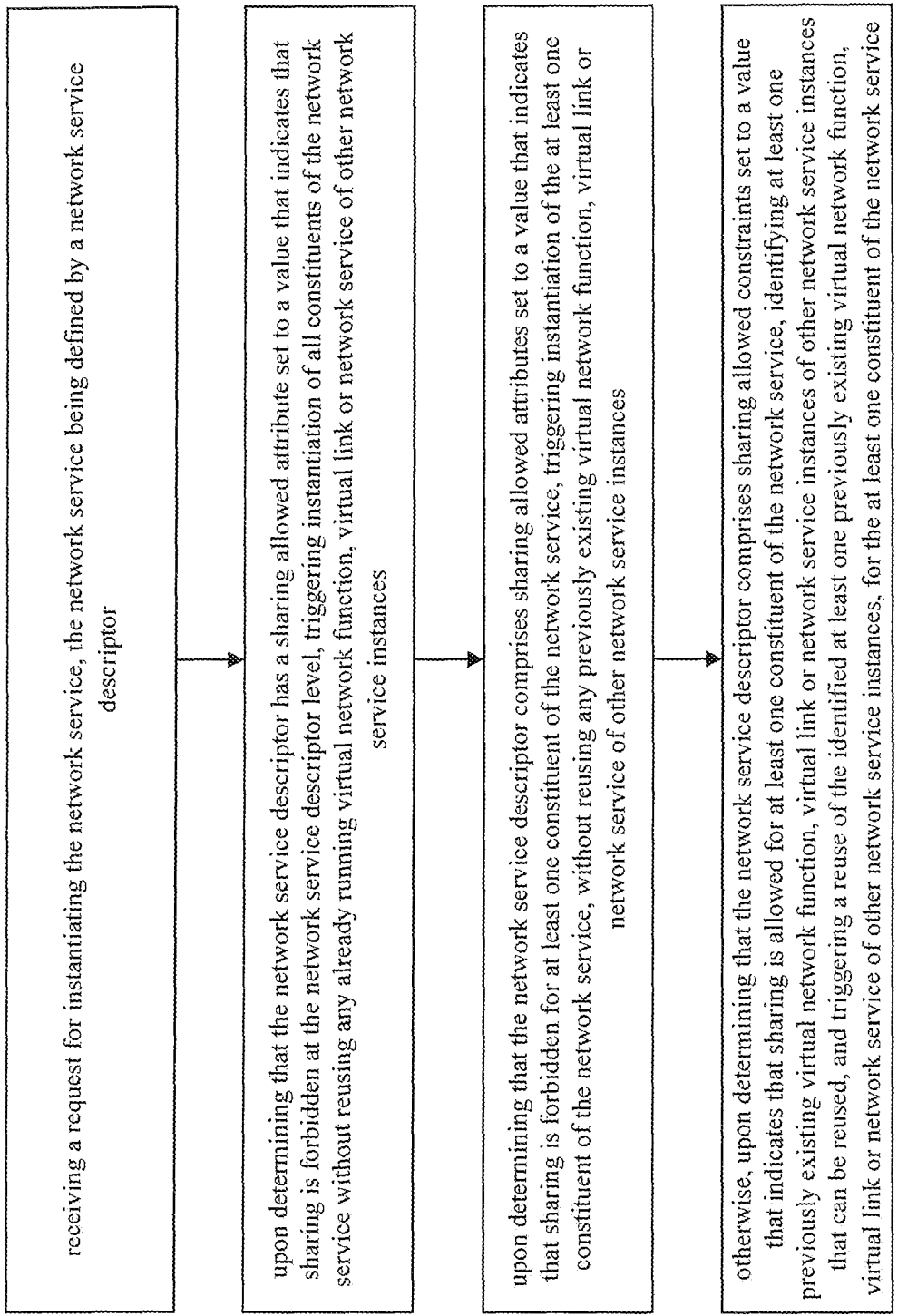
FIG. 13 is a flowchart of a method for instantiating a network service operating as at least a portion of a network slice.

FIG. 13 illustrates a method, executed by a network function virtualization orchestrator, for instantiating a network service operating as at least a portion of a network slice. The method comprises receiving a request for instantiating the network service, the network service being defined by a network service descriptor. The method comprises, upon determining that the network service descriptor has a sharing allowed attribute set to a value that indicates that sharing is forbidden at the network service descriptor level, triggering instantiation of all constituents of the network service without reusing any already running virtual network function, virtual link or network service of other network service instances. The method comprises, upon determining that the network service descriptor comprises sharing allowed attributes set to a value that indicates that sharing is forbidden for at least one constituent of the network service, triggering instantiation of the at least one constituent of the network service, without reusing any previously existing virtual network function, virtual link or network service of other network service instances. Otherwise, the method comprises, upon determining that the network service descriptor comprises sharing allowed constraints set to a value that indicates that sharing is allowed for at least one constituent of the network service, identifying at least one previously existing virtual network function, virtual link or network service instances of other network service instances that can be reused, and triggering a reuse of the identified at least one previously existing virtual network function, virtual link or network service of other network service instances, for the at least one constituent of the network service.

Figure 14:
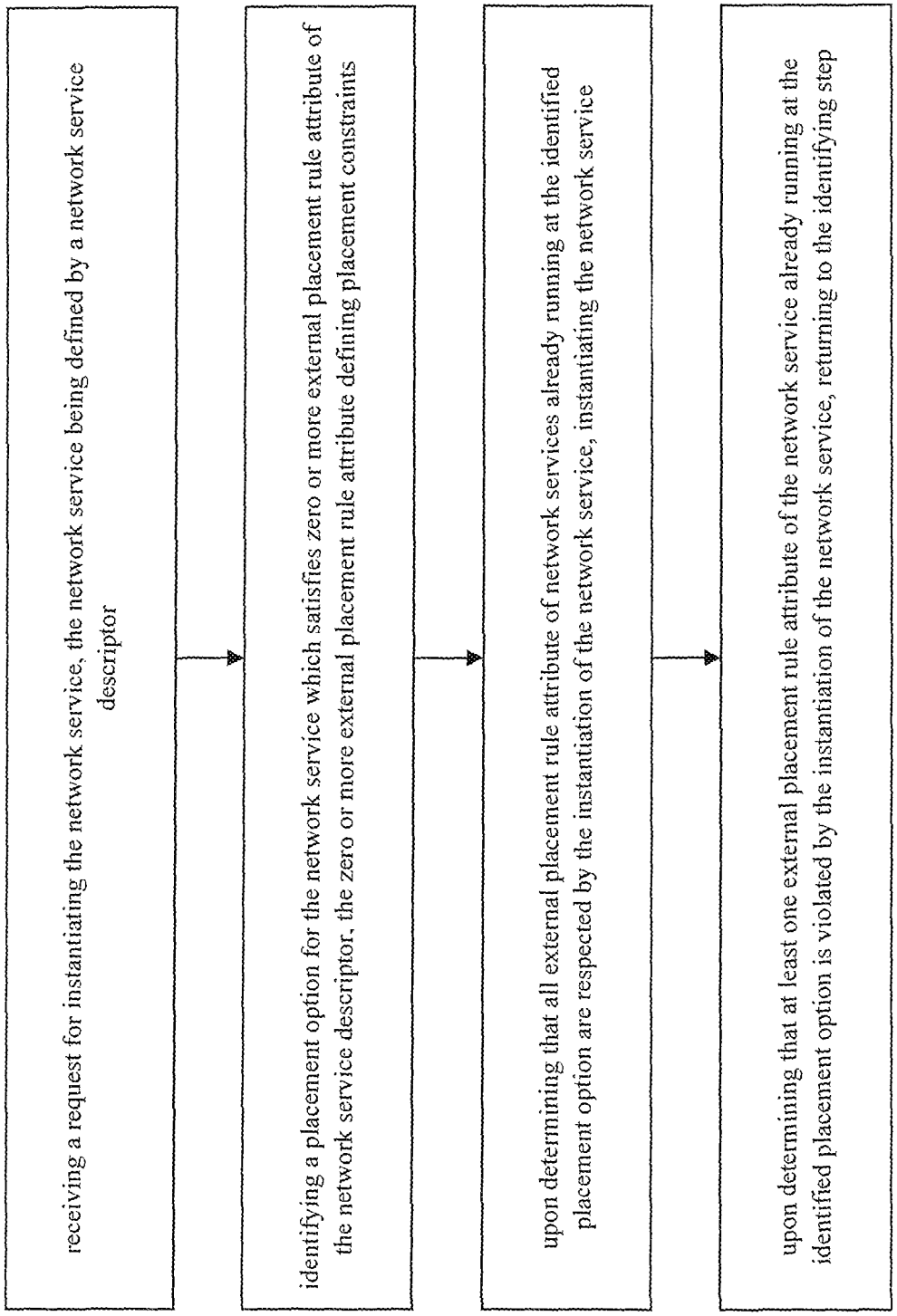
FIG. 14 is a flowchart of another method for instantiating a network service operating as at least a portion of a network slice.

FIG. 14 illustrates a method, executed by a network function virtualization orchestrator, for instantiating a network service operating as at least a portion of a network slice. The method comprises receiving a request for instantiating the network service, the network service being defined by a network service descriptor. The method comprises identifying a placement option for the network service which satisfies zero or more external placement rule attribute of the network service descriptor, the zero or more external placement rule attribute defining placement constraints. The method comprises, upon determining that all external placement rule attribute of network services already running at the identified placement option are respected by the instantiation of the network service, instantiating the network service. The method comprises, upon determining that at least one external placement rule attribute of the network service already running at the identified placement option is violated by the instantiation of the network service, returning to the identifying step.

The step of identifying a placement option may comprise identifying a placement option for each of a plurality of constituents of the network service, the plurality of constituents being virtual network functions, virtual links or nested network services. Determining may comprise determining that external placement rule attribute of virtual network functions, virtual links or nested network services of other network service instances already running at the identified placement option are violated or are not violated by the instantiation of the virtual network function, the virtual link or the nested network service.

The placement option may comprise a plurality of placement options for the plurality of constituents of the network service.

The network service descriptor may comprise at least one network service deployment flavor; a given sharing allowed attribute may define if the network service instance, a nested network service instance, a virtual network function instance or a virtual link instance associated with the given sharing allowed attribute is allowed to be shared with an other network service instance, or nested network service instance, virtual network function instance or virtual link instance associated with the other network service instance. A given external placement rule attribute may define if the network service instance, the nested network service instance, the virtual network function instance or the virtual link instance, is affine or anti-affine with current and future other network service instances, or nested network service instances, virtual network function instances or virtual link instances associated with the current and future other network service instances. The given sharing allowed attribute and the given external placement rule attribute allow to define the network slice and associated sharing and isolation constraints using the network service descriptor.

When there is zero sharing allowed attribute comprised in the network service descriptor, the network service descriptor may be considered or implied to comprise a default sharing allowed attribute value indicating that sharing is allowed.

Each of the at least one network service deployment flavor may define corresponding zero or more sharing allowed attribute and corresponding zero or more external placement rule attribute.

The zero or more sharing allowed attribute and the zero or more external placement rule attribute may be defined in relation with zero or more virtual network function descriptor, virtual link descriptor or nested network service descriptor referenced the at least one the network service deployment flavor of the network service descriptor.

When one of the zero or more sharing allowed attribute is set to a value that indicates that sharing is forbidden at the network service descriptor level, a network service instance created using the network service descriptor may not be shared with other network service instances and no constituent virtual network function instance, virtual link instance or nested network service instance of the network service instance is allowed to be shared.

A sharing allowed attribute set at the network service descriptor level may override any sharing allowed attribute set at lower levels of the network service descriptor, including nested network services, thereby allowing full logical isolation.

When one of the zero or more sharing allowed attribute is set to a value that indicates that sharing is allowed at the network service descriptor level, a network service instance created using the network service descriptor is allowed to be shared with other network services.

Having zero or more of the sharing allowed attribute set to a value that indicates that sharing is forbidden in relation with any virtual network function, virtual link, or nested network service, of the network service, may limit sharing at lower levels of the network service thereby allowing partial logical isolation.

The zero or more external placement rule attribute may comprise zero or more external absolute anti affinity rule attribute and zero or more external specific affinity or anti affinity rule attribute, the external absolute anti affinity rule attribute defining anti affinity with instances external to the network service instance and the external specific affinity or anti affinity rule attribute defining affinity or anti affinity with instances of specific known network services or virtual network functions.

Figure 15:
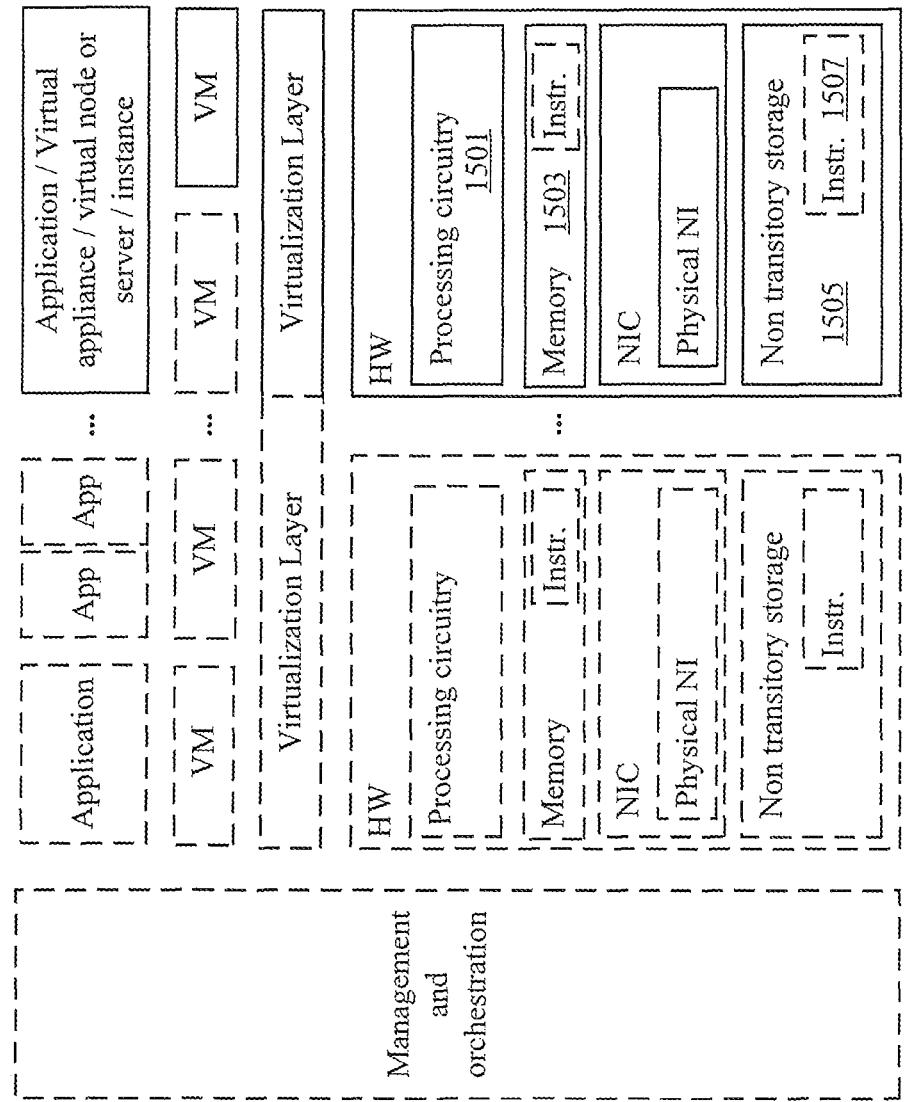
FIG. 15 is a schematic illustration of a virtualization environment in which the different method(s) and apparatus(es) described herein can be deployed.

Referring to FIG. 15, there is provided a virtualization environment in which functions and steps described herein can be implemented.

A virtualization environment (which may go beyond what is illustrated in FIG. 15), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 1501 and memory 1503. The memory can contain instructions executable by the processing circuitry whereby functions and steps described herein may be executed to provide any of the relevant features and benefits disclosed herein.

The hardware may also include non-transitory, persistent, machine readable storage media 1505 having stored therein software and/or instruction 1507 executable by processing circuitry to execute functions and steps described herein.

A system, or virtualization environment, is operative to execute a network function virtualization orchestrator (NFVO). The NFVO is operative to instantiate a network service instance operating as at least a portion of a network slice. The system comprising processing circuits 1501 and a memory 1503, the memory containing instructions executable by the processing circuits whereby the network function virtualization orchestrator is operative to execute any of the steps of any one of the methods described herein.

The above description and examples show that representing a network slice or a network slice subnet as a single possibly complex NS in a given NFV system eliminates the need for the NFV system to be aware of network slices and network slice subnets. It also allows one to express at the NS level the relation between network slices and network slice subnets for each given NFV system.

Based on this, the capability to express placement rules and sharing constraints with respect to entities external to the NS, i.e. other NS instances of the same or of different types, is provided so that the sharing and isolation requirements of network slices and network slice subnets can be supported by NFV systems. This allows one to describe these placement rules at design time with respect to instances and types yet unknown.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method, executed by a network function virtualization orchestrator, for instantiating a network service operating as at least a portion of a network slice, comprising:
   receiving a request for instantiating the network service, the network service being defined by a network service descriptor;
   upon determining that the network service descriptor has a sharing allowed attribute set to a value that indicates that sharing is forbidden at the network service descriptor level, triggering instantiation of all constituents of the network service without reusing any already running virtual network function, virtual link or network service of other network service instances;
   upon determining that the network service descriptor comprises sharing allowed attributes set to a value that indicates that sharing is forbidden for at least one constituent of the network service, triggering instantiation of the at least one constituent of the network service, without reusing any previously existing virtual network function, virtual link or network service of other network service instances; and
   otherwise, upon determining that the network service descriptor comprises sharing allowed constraints set to a value that indicates that sharing is allowed for at least one constituent of the network service, identifying at least one previously existing virtual network function, virtual link or network service instances of other network service instances that can be reused, and triggering a reuse of the identified at least one previously existing virtual network function, virtual link or network service of other network service instances, for the at least one constituent of the network service.

2. The method of claim 1, wherein the network service descriptor comprises at least one network service deployment flavor;
wherein a given sharing allowed attribute defines if the network service instance, a nested network service instance, a virtual network function instance or a virtual link instance associated with the given sharing allowed attribute is allowed to be shared with an other network service instance, or nested network service instance, virtual network function instance or virtual link instance associated with the other network service instance; and
wherein a given external placement rule attribute defining if the network service instance, the nested network service instance, the virtual network function instance or the virtual link instance, is affine or anti-affine with current and future other network service instances, or nested network service instances, virtual network function instances or virtual link instances associated with the current and future other network service instances;
wherein the given sharing allowed attribute and the given external placement rule attribute allowing to define the network slice and associated sharing and isolation constraints using the network service descriptor.

3. The method of claim 2, wherein, when there is zero sharing allowed attribute comprised in the network service descriptor, the network service descriptor is implied to comprise a default sharing allowed attribute value indicating that sharing is allowed.

4. The method of claim 2, wherein each of the at least one network service deployment flavor defines corresponding zero or more sharing allowed attribute and corresponding zero or more external placement rule attribute.

5. The method of claim 2, wherein the zero or more sharing allowed attribute and the zero or more external placement rule attribute are defined in relation with zero or more virtual network function descriptor, virtual link descriptor or nested network service descriptor referenced in the at least one the network service deployment flavor of the network service descriptor.

6. The method of claim 2, wherein, when one of the zero or more sharing allowed attribute is set to a value that indicates that sharing is forbidden at the network service descriptor level, a network service instance created using the network service descriptor cannot be shared with other network service instances and no constituent virtual network function instance, virtual link instance or nested network service instance of the network service instance is allowed to be shared.

7. The method of claim 2, wherein, a sharing allowed attribute set at the network service descriptor level overrides any sharing allowed attribute set at lower levels of the network service descriptor, including nested network services, thereby allowing full logical isolation.

8. The method of claim 2, wherein, when one of the zero or more sharing allowed attribute is set to a value that indicates that sharing is allowed at the network service descriptor level, a network service instance created using the network service descriptor is allowed to be shared with other network services.

9. The method of claim 2, wherein having zero or more of the sharing allowed attribute set to a value that indicates that sharing is forbidden in relation with any virtual network function, virtual link, or nested network service, of the network service, limits sharing at lower levels of the network service thereby allowing partial logical isolation.

10. The method of claim 2, wherein the zero or more external placement rule attribute comprises zero or more external absolute anti affinity rule attribute and zero or more external specific affinity or anti affinity rule attribute, the external absolute anti affinity rule attribute defining anti affinity with instances external to the network service instance and the external specific affinity or anti affinity rule attribute defining affinity or anti affinity with instances of specific known network services or virtual network functions.

* * * * *